United States Patent
Ito et al.

(10) Patent No.: US 10,868,978 B2
(45) Date of Patent: Dec. 15, 2020

(54) IMAGE PROCESSING DEVICE AND IMAGE PROCESSING METHOD

(71) Applicant: SONY CORPORATION, Tokyo (JP)

(72) Inventors: Atsushi Ito, Kanagawa (JP); Hideki Oyaizu, Tokyo (JP); Yuki Asukabe, Saitama (JP); Masayuki Yokoyama, Tokyo (JP); Makibi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 16/314,987

(22) PCT Filed: Mar. 30, 2017

(86) PCT No.: PCT/JP2017/013487
§ 371 (c)(1),
(2) Date: Jan. 3, 2019

(87) PCT Pub. No.: WO2018/012050
PCT Pub. Date: Jan. 18, 2018

(65) Prior Publication Data
US 2019/0313035 A1 Oct. 10, 2019

(30) Foreign Application Priority Data
Jul. 14, 2016 (JP) .................... 2016-139427

(51) Int. Cl.
*H04N 5/361* (2011.01)
*G01J 5/48* (2006.01)
(Continued)

(52) U.S. Cl.
CPC .............. *H04N 5/33* (2013.01); *G01J 1/42* (2013.01); *G01J 1/44* (2013.01); *G01J 5/48* (2013.01);
(Continued)

(58) Field of Classification Search
None
See application file for complete search history.

(56) References Cited

U.S. PATENT DOCUMENTS

| 2016/0044306 A1 | 2/2016 | Chahine et al. |
| 2019/0313035 A1* | 10/2019 | Ito ................ H04N 17/002 |
| 2020/0053297 A1* | 2/2020 | Tokizaki ............ G06T 5/50 |

FOREIGN PATENT DOCUMENTS

| CN | 101665210 A | 3/2010 |
| JP | 2001-268440 A | 9/2001 |

(Continued)

OTHER PUBLICATIONS

Jeon, et al., "Human Detection Based on the Generation of a Background Image by Using a Far-Infrared Light Camera", Sensors, vol. 15, No. 3, Mar. 19, 2012, pp. 6763-6788.
(Continued)

*Primary Examiner* — Thomas R Artman
(74) *Attorney, Agent, or Firm* — Chip Law Group

(57) ABSTRACT

Provided is an image processing device including an adjustment unit that adjusts any one of a background image which is a far-infrared image showing a background that does not include an object and a target image which is a far-infrared image showing the object, on the basis of a time change model of an observation pixel value, and an extraction unit that extracts a target region including the object in the target image on the basis of a result of comparison between the background image and the target image after the adjustment is performed.

12 Claims, 13 Drawing Sheets

(51) Int. Cl.
| | |
|---|---|
| *H04N 5/33* | (2006.01) |
| *H04N 17/00* | (2006.01) |
| *G01J 1/44* | (2006.01) |
| *G01J 1/42* | (2006.01) |
| *G06T 7/254* | (2017.01) |
| *H04N 5/232* | (2006.01) |

(52) U.S. Cl.
CPC ............ *G06T 7/254* (2017.01); *H04N 5/232* (2013.01); *H04N 5/361* (2013.01); *H04N 17/002* (2013.01); *G06T 2207/10048* (2013.01)

(56) References Cited

FOREIGN PATENT DOCUMENTS

| | | |
|---|---|---|
| JP | 2010-058903 A | 3/2010 |
| JP | 2010-262422 A | 11/2010 |
| WO | 2016/022525 A1 | 2/2016 |

OTHER PUBLICATIONS

Extended European Search Report of EP Application No. 17827184.7, dated May 2, 2019, 13 pages.
International Search Report and Written Opinion of PCT Application No. PCT/JP2017/013487, dated Jun. 27, 2017, 10 pages of ISRWO.

* cited by examiner

FIG. 5
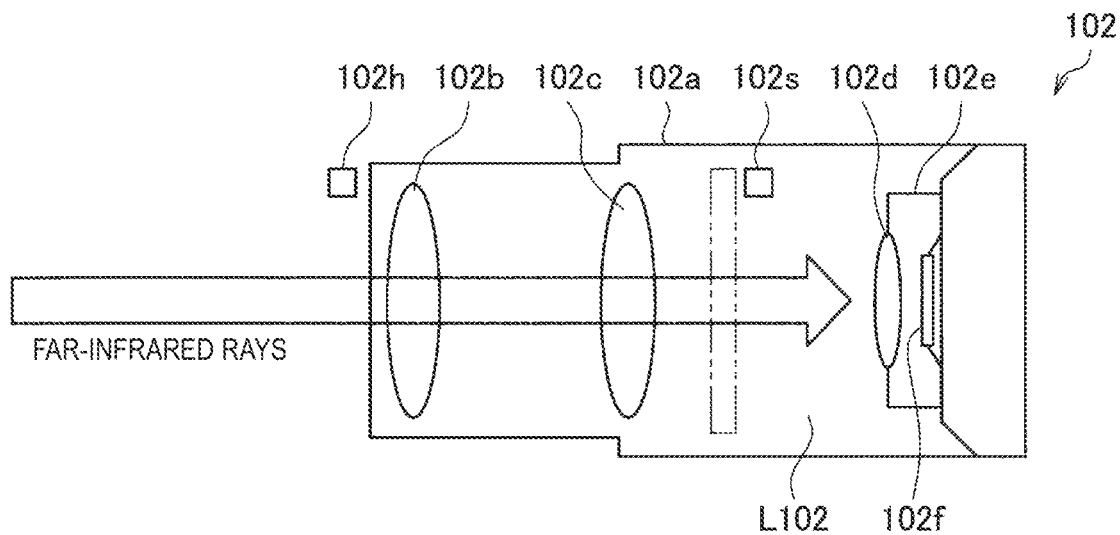
STATE WHERE SHUTTER IS OPENED
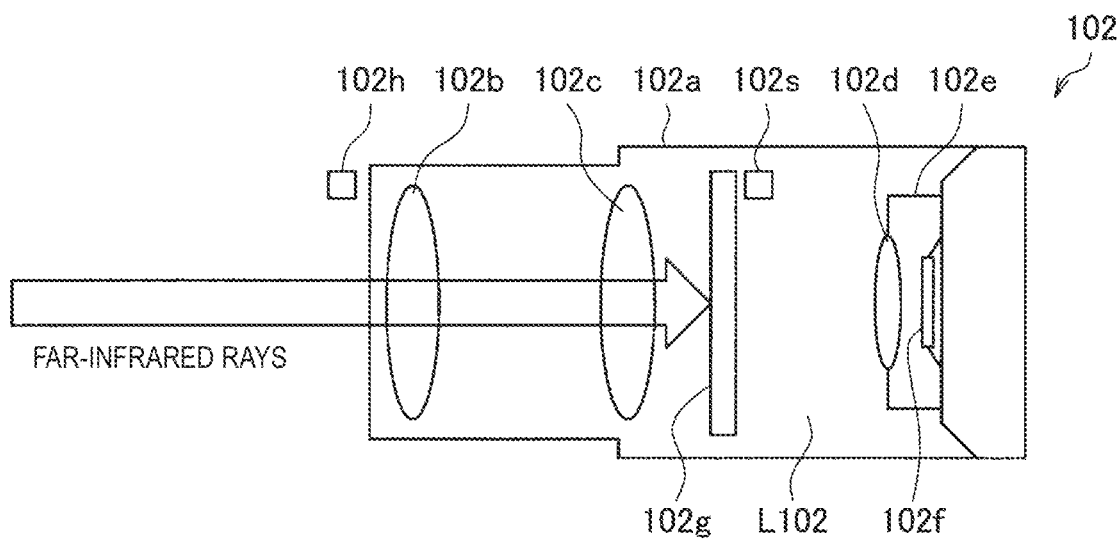
STATE WHERE SHUTTER IS CLOSED

IMAGE PROCESSING DEVICE AND IMAGE PROCESSING METHOD

CROSS REFERENCE TO RELATED APPLICATIONS

This application is a U.S. National Phase of International Patent Application No. PCT/JP2017/013487 filed on Mar. 30, 2017, which claims priority benefit of Japanese Patent Application No. JP 2016-139427 filed in the Japan Patent Office on Jul. 14, 2016. Each of the above-referenced applications is hereby incorporated herein by reference in its entirety.

TECHNICAL FIELD

The present disclosure relates to an image processing device and an image processing method.

BACKGROUND ART

In recent years, far-infrared images have been used for the purpose of night vision and the like. A far-infrared image is generated by an imaging element capturing far-infrared rays emitted by black-body radiation from an object. In the imaging of a far-infrared image, a thermal-type imaging element converting emitted far-infrared rays into heat and outputting a change in temperature as an electrical signal may be used. In a far-infrared image captured using such an imaging element, a pixel value may fluctuate due to a fluctuation in the temperature of the imaging element itself caused by incidence of infrared energy from a portion other than a subject even when the temperature of the subject is fixed. Consequently, techniques for suppressing a fluctuation in a pixel value due to a fluctuation in the temperature of such an imaging element have been proposed.

For example, Patent Literature 1 proposes a technique in which, in an imaging system including a shutter capable of preventing infrared radiation from being incident on a sensor including a thermal-type imaging element in order to compensate for an output signal of the sensor with respect to a fluctuation in the temperature of the sensor, a parameter related to the sensor is updated on the basis of a difference between the temperature of the sensor which is obtained by scanning the sensor when the shutter is closed and the current temperature of the sensor by periodically operating the shutter.

CITATION LIST

Patent Literature

Patent Literature 1: JP 2003-532111T

DISCLOSURE OF INVENTION

Technical Problem

However, in fields related to far-infrared images, a fluctuation in a pixel value caused by a fluctuation in the temperature of an imaging element due to incidence of infrared energy from a portion other than a subject may occur to a considerable extent. Specifically, in the technique disclosed in Patent Literature 1, the temperature of the sensor may fluctuate after the shutter is temporarily closed. Thereby, a fluctuation in a pixel value of a far-infrared image to be obtained may occur due to a fluctuation in the temperature of the sensor.

Incidentally, in fields related to visible light images, a technique for extracting a target region having an object such as a moving object seen in an obtained visible light image has been used. Specifically, there is known a technique called a background differencing technique for extracting a target region on the basis of a result of comparison between a background image which is an image having a background, not including an object, seen therein and a target image which is an image having the object seen therein. Here, by applying the background differencing technique to a far-infrared image, it is considered that a target region can be extracted even when it is difficult to extract the target region for the visible light image.

As described above, in a far-infrared image, a fluctuation in a pixel value may occur due to a fluctuation in the temperature of an imaging element caused by incidence of infrared energy from a portion other than a subject. Therefore, in a case in which a background differencing technique is applied to a far-infrared image, a difference in a pixel value in a region having a background seen therein may occur between a background image and a target image. Here, in the background differencing technique, the extraction of a target region is performed by comparing, for example, pixel values of the background image and the target image with each other. Accordingly, it may become difficult to extract the target region for the far-infrared image with a high level of accuracy.

Consequently, the present disclosure proposes a new and improved image processing device and image processing method which are capable of extracting a target region for a far-infrared image with a high level of accuracy.

Solution to Problem

According to the present disclosure, there is provided an image processing device including: an adjustment unit that adjusts any one of a background image which is a far-infrared image showing a background that does not include an object and a target image which is a far-infrared image showing the object, on the basis of a time change model of an observation pixel value; and an extraction unit that extracts a target region including the object in the target image on the basis of a result of comparison between the background image and the target image after the adjustment is performed.

In addition, according to the present disclosure, there is provided an image processing method including: adjusting any one of a background image which is a far-infrared image showing a background that does not include an object and a target image which is a far-infrared image showing the object by an image processing device, on the basis of a time change model of an observation pixel value; and extracting a target region including the object in the target image on the basis of a result of comparison between the background image and the target image after the adjustment is performed.

In addition, according to the present disclosure, there is provided an image processing device including: an adjustment unit that adjusts at least one of a target image which is a far-infrared image showing an object and a reference image for extracting a target region including the object in the target image, on the basis of information related to a time change in a pixel value of a far-infrared image captured by an imaging element used to capture the reference image and the target image caused by a fluctuation in a temperature of the imaging element due to incidence of infrared energy from a portion other than a subject; and an extraction unit that extracts the target region on the basis of a result of comparison between the reference image and the target image after the adjustment is performed.

Advantageous Effects of Invention

As described above, according to the present disclosure, it is possible to extract a target region for a far-infrared image with a high level of accuracy.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a schematic diagram illustrating an example of a configuration of an infrared camera.

MODE(S) FOR CARRYING OUT THE INVENTION

Figure 1:
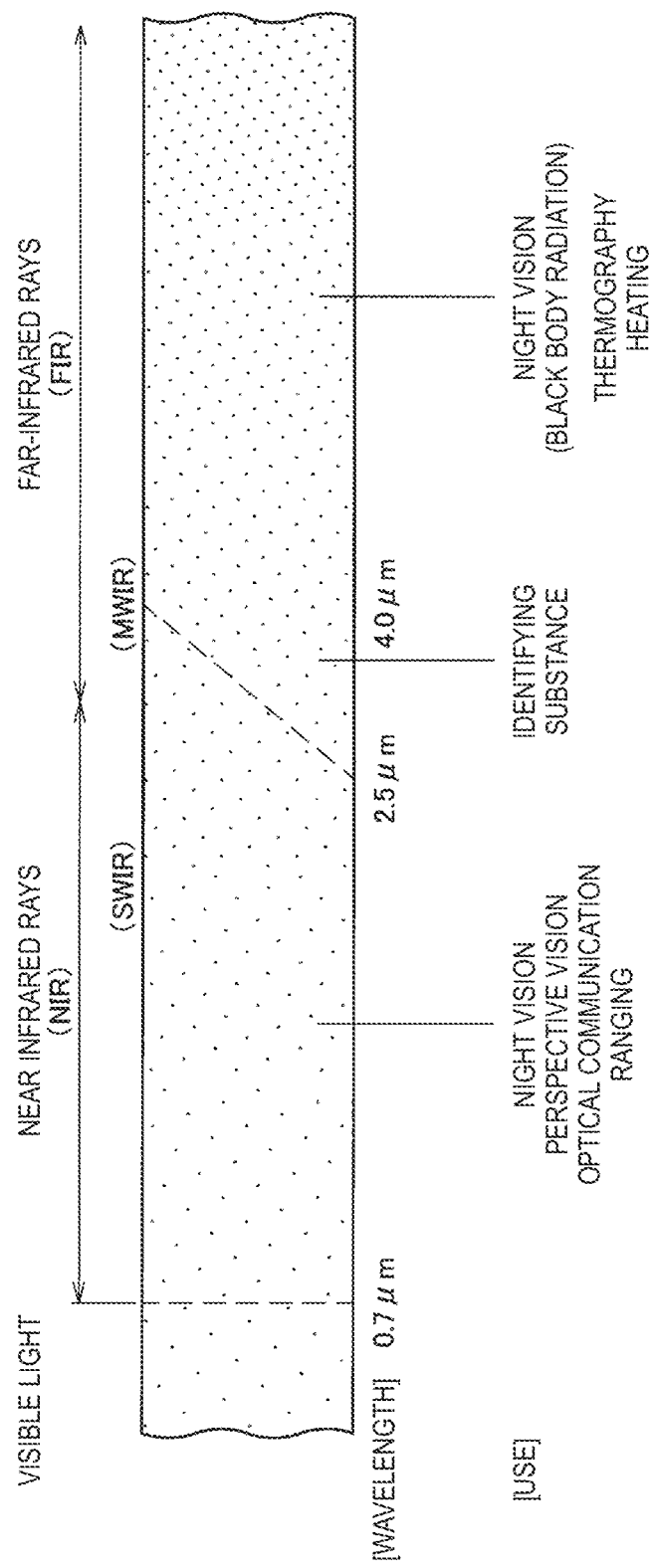
FIG. 1 is an explanatory diagram illustrating various uses of an infrared image which depends on a wavelength.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that a description will be given in the following order.
1. Introduction
2. Image processing device
2-1. Hardware configuration
2-2. Functional configuration
2-3. Operation
3. Modification example
3-1. Outline of inter-frame differencing technique
3-2. Functional configuration
3-3. Operation
4. Summary 1. Introduction FIG. 1 is an explanatory diagram illustrating various applications of an infrared image which depends on a wavelength. The horizontal direction of FIG. 1 corresponds to a wavelength of the infrared light and the wavelength is lengthened from the left to the right. Light that has a wavelength equal to or less than 0.7 μm is visible light and a human visual sense detects the visible light. A wavelength region adjacent to the visible light region is a near-infrared light region (NIR) and the infrared light belonging to the NIR region is referred to as near-infrared light. The upper limit of the wavelength of the NIR region differs depending on definition and is between 2.5 μm to 4.0 μm in many cases. A portion with a relatively long wavelength in the NIR region is also referred to as a short-wavelength infrared (SWIR) region in some cases. The near-infrared light can be used for, for example, night vision, perspective vision, optical communication, and distance measurement. Normally, a camera that captures a near-infrared image first emits infrared light to the vicinity and captures reflected light. The wavelength region adjacent to the NIR region on a long-wavelength side is a far-infrared (FIR) region and infrared ray belonging to the FIR region is referred to as far-infrared light. A portion with a relatively short wavelength in the FIR region is also referred to as a middle-wavelength infrared (MWIR) region in some cases. Since an absorption spectrum specific to a substance is shown in a wavelength range of the middle-wavelength infrared light, middle-wavelength infrared light can be used to identify the substance. The far-infrared light can be used for night vision, thermography, and heating. The infrared light emitted by black body radiation from a substance is equivalent to the far-infrared light. Therefore, a night vision device that uses the far-infrared light can generate a far-infrared image by trapping the black body radiation from the substance even when the night vision device does not emit the infrared light. Note that the boundary values of the ranges of the wavelengths illustrated in FIG. 1 are merely exemplary. There are various definitions for the boundary values of classification of the infrared light, and thus the advantages of the technology according to the present disclosure to be described below can be gained under any definition.

Specifically, in the imaging of a far-infrared image, a thermal-type imaging element converting emitted far-infrared rays into heat and outputting a change in temperature as an electrical signal may be used. In a far-infrared image captured using such an imaging element, a pixel value may fluctuate due to a fluctuation in the temperature of the imaging element itself caused by incidence of infrared energy from a portion other than a subject even when the temperature of the subject is fixed.

Consequently, as described above, a method using a shutter capable of preventing far-infrared rays from being incident on a thermal-type imaging element in order to suppress a fluctuation in such a pixel value has been proposed. In the method using the shutter, for example, a closed image which is a far-infrared image is captured when the shutter is temporarily closed, and an open image which is a far-infrared image captured in a state where the shutter is temporarily closed and then opened is corrected on the basis of the closed image. Specifically, the open image is corrected by correcting a pixel value of the open image by a pixel value of the closed image. Hereinafter, the correction is also referred to as shutter correction. In the shutter correction, more specifically, the open image is corrected by subtracting the pixel value of the closed image from the pixel value of the open image.

Figure 2:
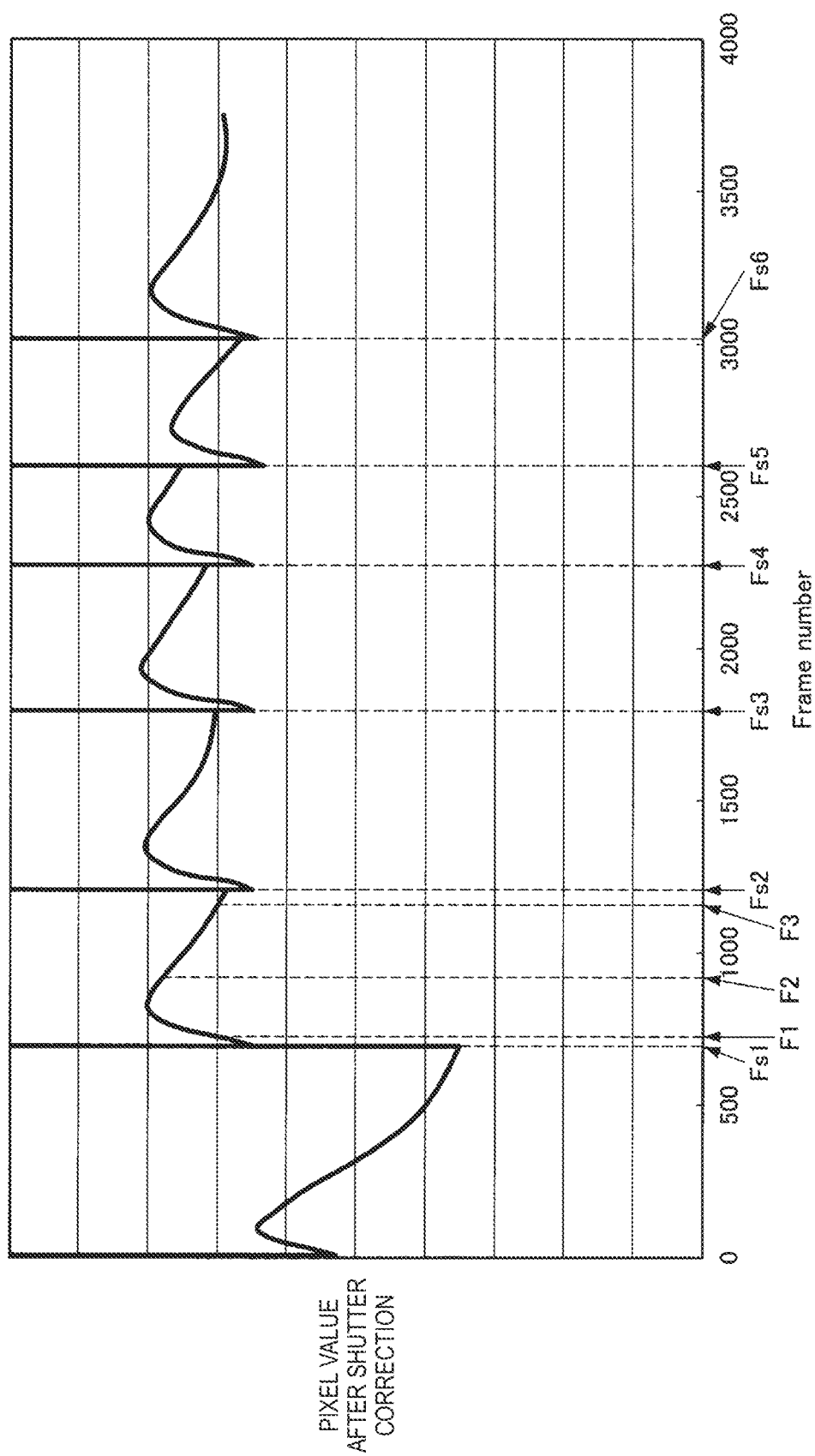
FIG. 2 is a diagram illustrating an example of a change in a pixel value with time after shutter correction.

FIG. 2 is a diagram illustrating an example of a change in a pixel value with time after shutter correction. Specifically, FIG. 2 illustrates an example of a change in a pixel value with time after shutter correction for a representative pixel which is one pixel in a far-infrared image obtained by continuously imaging a homoiothermic subject. Shutter frames Fs1 to Fs6 illustrated in FIG. 2 are frames equivalent to a closed image captured in a state where a shutter is temporarily closed. As illustrated in FIG. 2, pixel values in frames immediately after the respective shutter frames Fs1 to Fs6 are substantially consistent with each other.

However, a pixel value may fluctuate at a time equivalent to a time between the adjacent shutter frames. Specifically, the shutter is closed, and thus heat may accumulate in an accommodation space in which the imaging element is accommodated. In this case, after the shutter is temporarily closed, the temperature of the imaging element is increased. Thereby, a pixel value after shutter correction is increased after the shutter is closed as illustrated in FIG. 2. In addition, after a temperature in the accommodation space and a temperature outside the accommodation space reach equilibrium, the temperature of the imaging element is lowered. Thereby, a pixel value after shutter correction is increased and then decreased as illustrated in FIG. 2 after the shutter is temporarily closed. In this manner, a fluctuation in the pixel value caused by a fluctuation in the temperature of the imaging element due to incidence of infrared energy from a portion other than a subject may occur to a considerable extent.

Note that, as another method for suppressing a fluctuation in a pixel value of a far-infrared image caused by a fluctuation in the temperature of a thermal-type imaging element, a method of performing image processing focusing on individual differences in sensitivities of imaging elements corresponding to respective pixels has been proposed. However, in such a method, the amount of data used in each processing may become relatively large, and thus the consumption of a memory may increase as compared to a method using shutter correction.

Figure 3:
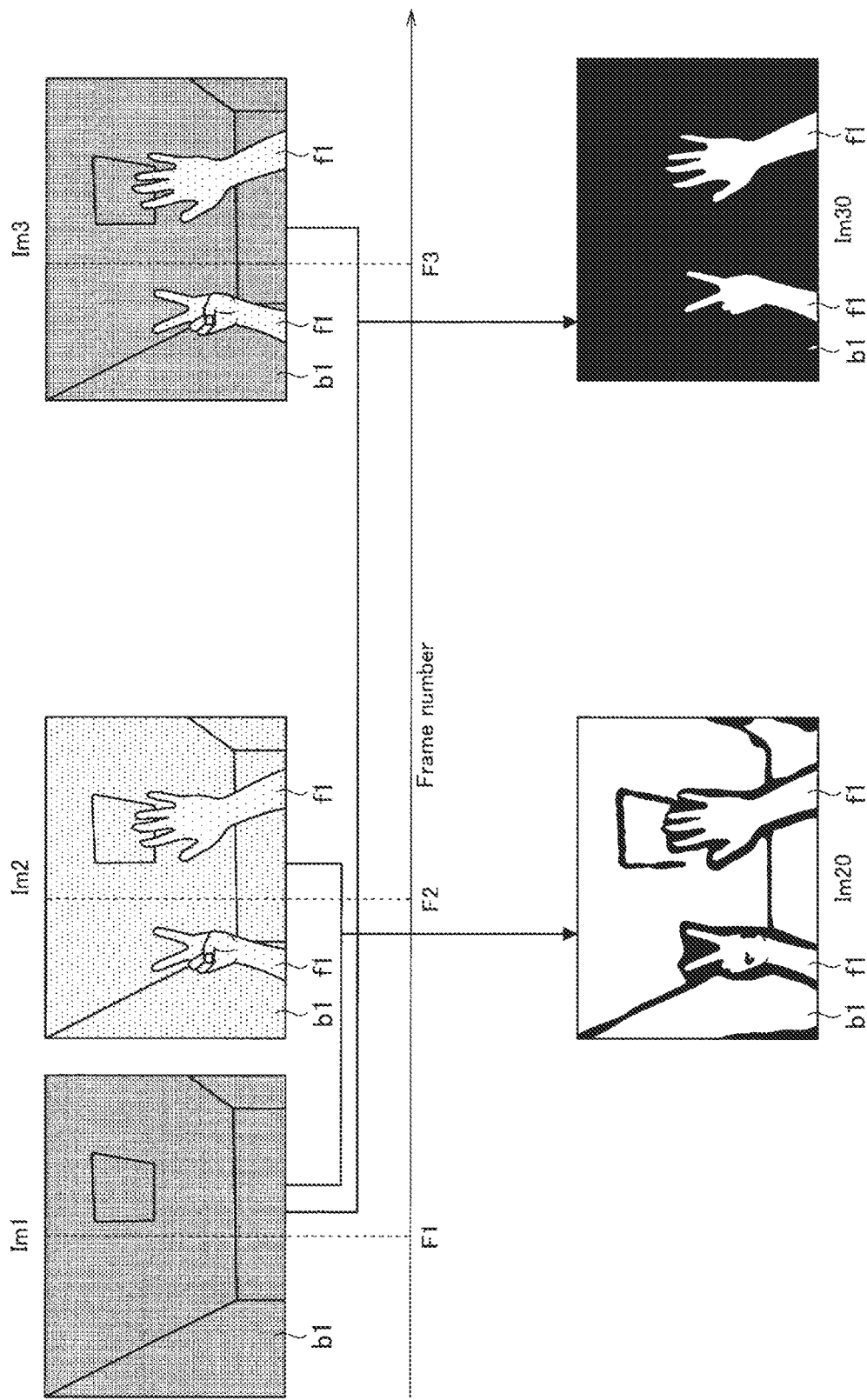
FIG. 3 is a diagram illustrating an example of a result of extraction performed using a background differencing technique for a far-infrared image of each frame.

Here, a case is considered in which a target region having an object seen therein is extracted in a far-infrared image obtained by the above-described method using shutter correction by applying a background differencing technique to the far-infrared image. FIG. 3 is a diagram illustrating an example of a result of extraction performed using a background differencing technique for a far-infrared image of each frame. It is assumed that a frame F1, a frame F2, and a frame F3 between the shutter frame Fs1 and the shutter frame Fs2 illustrated in FIG. 2 respectively correspond to a far-infrared image Im1, a far-infrared image Im2, and a far-infrared image Im3 illustrated in FIG. 3. In addition, the far-infrared image Im1 is equivalent to a background image which is a far-infrared image having a background, not including an object, seen therein, and the far-infrared image Im2 and the far-infrared image Im3 are equivalent to a target image which is a far-infrared image having an object seen therein.

In the background differencing technique, specifically, first, a differential image is generated by obtaining a difference in a pixel value between a background image and a target image. Next, a target region is extracted by performing binarization processing on the differential image. In addition, as a result of the extraction, a binarized image is output. As illustrated in FIG. 3, an interior portion b1 such as a wall and a ceiling as a background is seen in the far-infrared image Im1 which is a background image. In addition, the interior portion b1 as a background and an arm f1 of a person as an object are seen in the far-infrared image Im2 and the far-infrared image Im3 which are target images. Here, in the far-infrared image illustrated in FIG. 3, shading of hatching indicates a difference in a pixel value. A section in which the hatching is darker is a section having a smaller pixel value.

As illustrated in FIG. 2, pixel values after shutter correction which correspond to the frame F3 and the frame F1 are substantially consistent with each other. Therefore, pixel values in regions having the interior portion b1 seen therein in the far-infrared image Im3 and the far-infrared image Im1 are substantially consistent with each other. Accordingly, regarding the far-infrared image Im1 as a background image and the far-infrared image Im3 as a target image, pixel values in regions having the interior portion b1 as a background seen therein are substantially consistent with each other. On the other hand, as illustrated in FIG. 2, a pixel value after shutter correction corresponding to the frame F2 is larger than that of the frame F1. Therefore, the pixel value in the region having the interior portion b1 seen therein in the far-infrared image Im2 is larger than that of the far-infrared image Im1. Accordingly, regarding the far-infrared image Im1 as a background image and the far-infrared image Im2 as a target image, there is a difference in a pixel value in a region having the interior portion b1 as a background seen therein.

FIG. 3 illustrates a binarized image Im30 generated by performing binarization processing on a differential image generated with respect to the far-infrared image Im3 and the far-infrared image Im1. In addition, FIG. 3 illustrates a binarized image Im20 generated by performing binarization processing on a differential image generated with respect to the far-infrared image Im2 and the far-infrared image Im1. In the binarization processing, for example, a first pixel value which is a relatively small value is allocated to a pixel having a pixel value smaller than a threshold value in the differential image, and a second pixel value which is a relatively large value is allocated to a pixel having a pixel value larger than the threshold value in the differential image. Thereby, the extraction of a target region having an object seen therein may be realized by allocating the second pixel value to the target region.

As illustrated in FIG. 3, in the binarized image Im30, a first pixel value is allocated to a region which is substantially consistent with an arm region having the arm f1 seen therein in the far-infrared image Im3, and a second pixel value different from the first pixel value is allocated to a region which is substantially consistent with an interior portion region having the interior portion b1 seen therein in the far-infrared image Im3. Therefore, the arm region as a target region is appropriately extracted. On the other hand, in the binarized image Im20, a second pixel value is allocated to a portion within a region which is substantially consistent with the arm region having the arm f1 seen therein in the far-infrared image Im3, and a first pixel value is allocated to a portion of a region which is substantially consistent with the interior portion region having the interior portion b1 seen therein in the far-infrared image Im3. Therefore, the extraction of the arm region as a target region is not appropriately performed.

In this manner, in the far-infrared image, it may become difficult to extract a target region with a high level of accuracy due to a fluctuation in a pixel value which may occur due to a fluctuation in the temperature of the imaging element caused by incidence of infrared energy from a portion other than a subject. Consequently, in this specification, a system capable of extracting a target region for a far-infrared image with a high level of accuracy is proposed.

2. Image Processing Device

Next, an overview of an image processing device 1 according to an embodiment of the present disclosure will be described with reference to FIGS. 4 to 12.

[2-1. Hardware Configuration]

First, a hardware configuration of the image processing device 1 according to the embodiment will be described with reference to FIG. 4 and FIG. 5.

Figure 4:
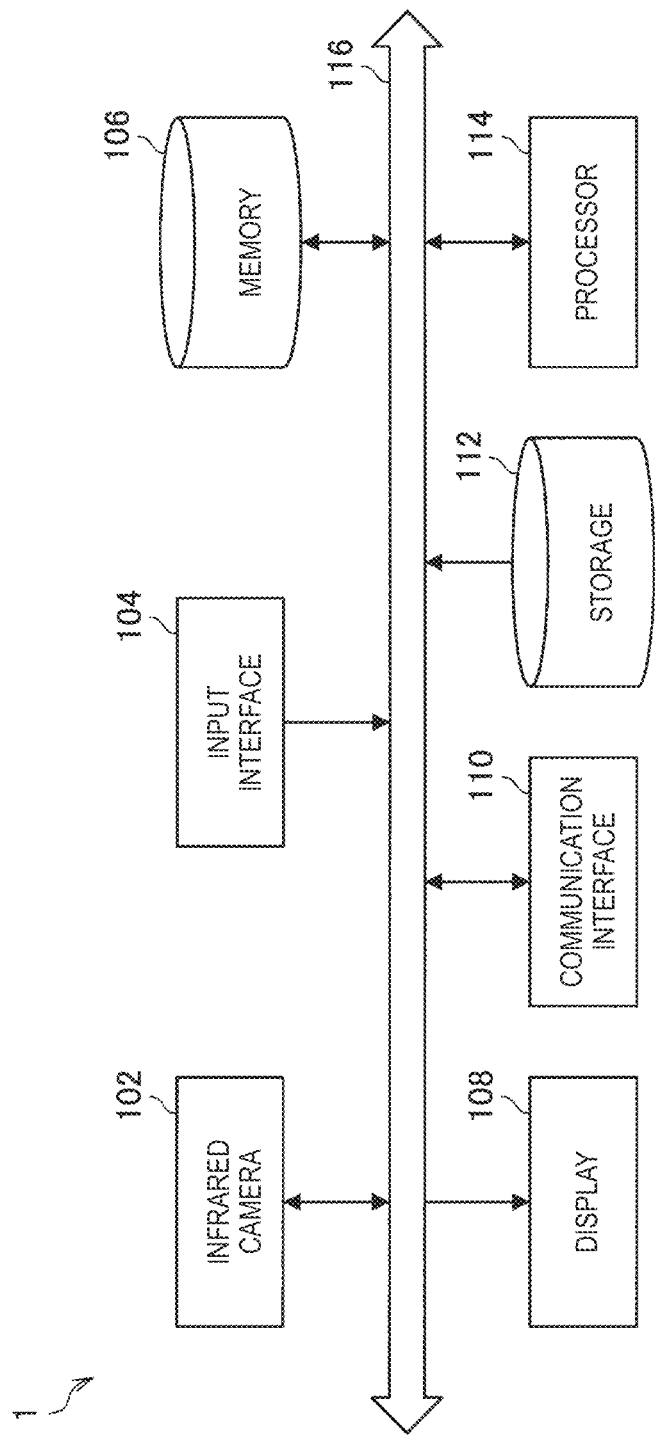
FIG. 4 is a block diagram illustrating an example of a hardware configuration of an image processing device according to an embodiment of the present disclosure.

FIG. 4 is a block diagram illustrating an example of a hardware configuration of the image processing device 1 according to the embodiment. As illustrated in FIG. 4, the image processing device 1 includes an infrared camera 102, an input interface 104, a memory 106, a display 108, a communication interface 110, a storage 112, a processor 114, and a bus 116.

(Infrared Camera)

The infrared camera 102 is an imaging module that performs imaging using infrared light and obtains an infrared image which is a non-color image. The infrared camera 102 is equivalent to an imaging unit according to the present disclosure. Specifically, the infrared camera 102 has an array of an imaging element that detects far-infrared light with wavelengths belonging to the FIR region and captures a far-infrared image. For example, the infrared camera 102 captures far-infrared images at a given time interval. In addition, a series of far-infrared images obtained from the infrared camera 102 may form a video.

The infrared camera 102 according to the present embodiment is provided with a thermal-type imaging element that converts emitted far-infrared rays into heat and outputs a change in temperature as an electrical signal. Specifically, a bolometer is used as an imaging element in the infrared camera 102. A resistance value of the bolometer changes due to heating by irradiation with far-infrared rays. A voltage value according to a change in temperature may be detected by applying a current to the bolometer.

FIG. 5 is a schematic diagram illustrating an example of a configuration of the infrared camera 102. As illustrated in FIG. 5, the infrared camera 102 includes a housing 102a, a first lens 102b, a second lens 102c, a light transmitting portion 102d, a cover portion 102e, a bolometer 102f, and a shutter 102g. The shutter 102g can temporarily close an accommodation space L102 in which the bolometer 102f is accommodated, and FIG. 5 illustrates a state where the shutter 102g is opened and a state where the shutter 102g is closed. In this manner, the accommodation space L102 is provided to be temporarily closed.

The housing 102a is provided with an opening on a subject side, and far-infrared rays emitted to the infrared camera 102 are incident on the housing 102a from the opening. The first lens 102b and the second lens 102c are provided in parallel in this order from the outside on the subject side within the housing 102a. The first lens 102b and the second lens 102c are provided to condense the emitted far-infrared rays into the bolometer 102f. Note that the bolometer 102f and the cover portion 102e covering the bolometer 102f are provided on a side opposite to the subject within the housing 102a in which such a number and arrangement of lenses is not particularly limited. In addition, the light transmitting portion 102d transmitting the emitted far-infrared rays is provided on the subject side in the cover portion 102e. In a state where the shutter 102g is opened, the far-infrared rays emitted to the infrared camera 102 pass through the first lens 102b, the second lens 102c, and the light transmitting portion 102d in this order and are then condensed on the bolometer 102f. Thereby, the far-infrared rays are sensed by the bolometer 102f.

The shutter 102g can temporarily close the accommodation space L102 equivalent to a space on a side closer to the bolometer 102f than the shutter 102g within the housing 102a. For example, the shutter 102g is provided to be capable of being opened and closed between the second lens 102c and the light transmitting portion 102d. In a state where the shutter 102g is closed, far-infrared rays emitted to the infrared camera 102 pass through the first lens 102b and the second lens 102c in this order and are then blocked by the shutter 102g. For example, the shutter 102g is periodically closed at fixed frame intervals. In addition, a time when the shutter 102g is closed may be determined on the basis of a temperature inside the accommodation space L102 which is detected by the inner sensor 102s. Hereinafter, a far-infrared image captured in a state where the accommodation space L102 is temporarily closed by the shutter 102g is also called a closed image, and a far-infrared image captured in a state where the accommodation space L102 is temporarily closed by the shutter 102g and is then opened is also called an open image. Note that the open image includes a background image and a target image.

In addition, the inner sensor 102s is provided within the accommodation space L102. The inner sensor 102s detects a temperature inside the accommodation space L102. In addition, an outer sensor 102h is provided outside the accommodation space L102. The outer sensor 102h detects a temperature outside the accommodation space L102. For example, the outer sensor 102h may be provided outside the housing 102a, or may be provided on a side closer to the subject than the shutter 102g within the housing 102a. Hereinafter, referring back to FIG. 4, a description of a hardware configuration of the image processing device 1 will be continued.

(Input Interface)

The input interface 104 is used by the user to manipulate the image processing device 1 or input information to the image processing device 1. For example, the input interface 104 may include an input device such as a touch sensor, a keyboard, a keypad, a button, or a switch. In addition, the input interface 104 may include a voice input microphone and a voice recognition module. In addition, the input interface 104 may include a remote manipulation module that receives a command selected by the user from a remote device.

(Memory)

The memory 106 is a storage medium that can include a random access memory (RAM) and a read-only memory (ROM). The memory 106 is connected to the processor 114 and stores data and a program used for a process performed by the processor 114.

(Display)

The display 108 is a display module that has a screen on which an image is displayed. For example, the display 108 may be a liquid crystal display (LCD), an organic light-emitting diode (OLED), a cathode ray tube (CRT), or the like.

(Communication Interface)

The communication interface 110 is a module that relays communication between the image processing device 1 and another device. The communication interface 110 establishes communication connection in conformity with any wireless communication protocol or wired communication protocol.

(Storage)

The storage 112 is a storage device that accumulates infrared image data or stores a database used for image processing. The storage 112 contains a storage medium such as a semiconductor memory or a hard disk. Note that data and a program to be described in the present specification may be acquired from an external data source (for example, a data server, a network storage, an externally attached memory, or the like) of the image processing device 1.

(Processor)

The processor 114 is a processing module such as a central processing unit (CPU) or a digital signal processor (DSP). The processor 114 executes a program stored in the memory 106 or another storage medium to operate a function for making it possible to extract a target region for a far-infrared image with a high level of accuracy.

(Bus)

The bus 116 connects the infrared camera 102, the input interface 104, the memory 106, the display 108, the communication interface 110, the storage 112, and the processor 114 to each other.

[2-2. Functional Configuration]

Next, a functional configuration of the image processing device 1 according to the present embodiment will be described with reference to FIGS. 6 to 11.

Figure 6:
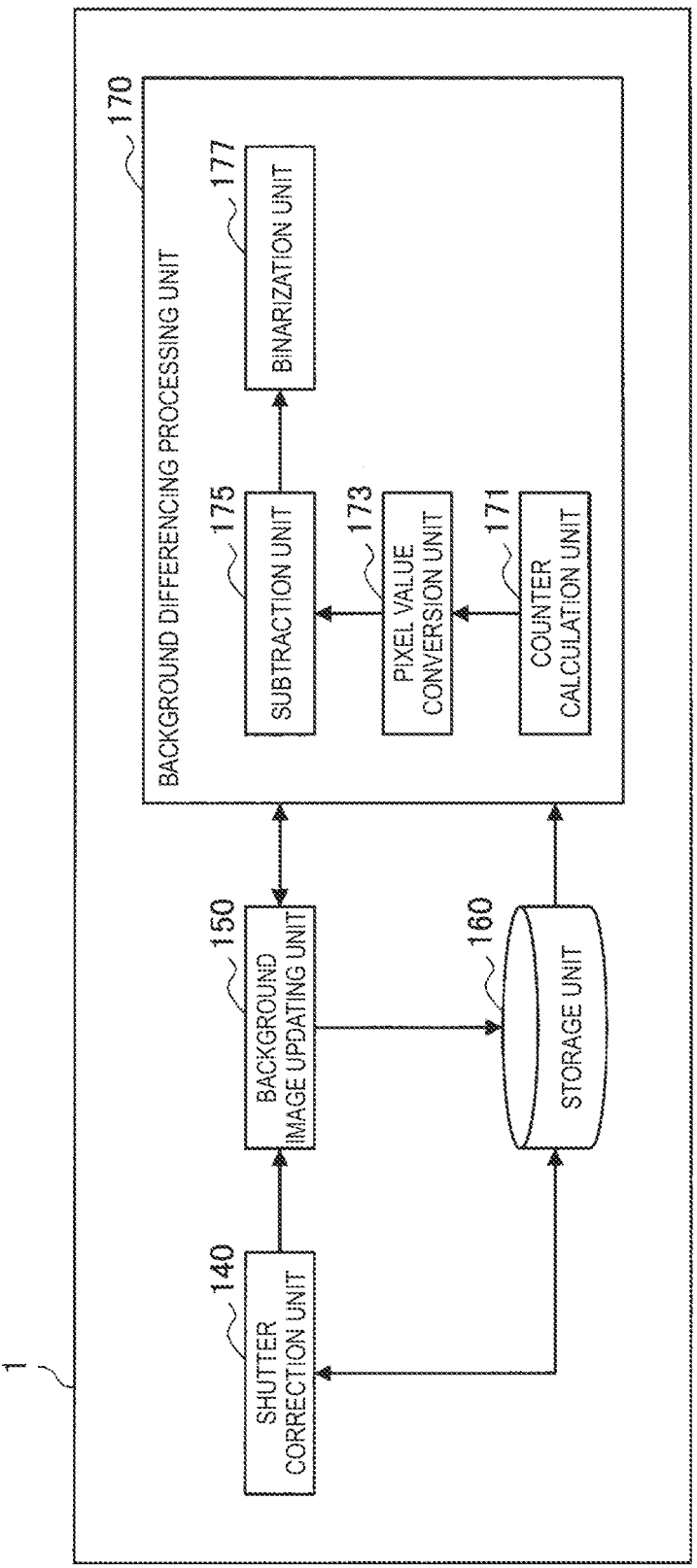
FIG. 6 is a block diagram illustrating an example of a functional configuration of the image processing device according to the embodiment.

FIG. 6 is a block diagram illustrating an example of a functional configuration realized by association of components of the image processing device 1 illustrated in FIG. 4. As illustrated in FIG. 6, the image processing device 1 includes a shutter correction unit 140, a background image updating unit 150, a storage unit 160, and a background differencing processing unit 170.

(Shutter Correction Unit)

The shutter correction unit 140 executes shutter correction for correcting an open image captured by the infrared camera 102 on the basis of a closed image, and outputs the open image after the shutter correction to the background image updating unit 150. The shutter correction unit 140 is equivalent to a correction unit according to the present disclosure. Specifically, the shutter correction unit 140 corrects a pixel value of the open image using a pixel value of the closed image to correct the open image. For example, the shutter correction unit 140 subtracts the pixel value of the closed image from the pixel value of the open image to correct the open image. Specifically, the shutter correction unit 140 subtracts a pixel value of a corresponding pixel of the closed image with respect to each pixel of the open image to correct the open image. By executing such shutter correction, it is possible to partially suppress a fluctuation in a pixel value caused by a fluctuation in the temperature of the bolometer 102f due to incidence of infrared energy from a portion other than a subject, as described above. The closed image used in the shutter correction is stored in the storage unit 160.

Further, in a case in which a far-infrared image captured by the infrared camera 102 is a closed image, the shutter correction unit 140 updates the closed image stored in the storage unit 160 to the far-infrared image. Note that, when a far-infrared image is captured by the infrared camera 102, the image processing device 1 may generate information indicating whether or not a frame corresponding to the far-infrared image is a shutter frame. Thereby, each functional portion in the image processing device 1 may determine whether or not the captured far-infrared image is a closed image or an open image. Specifically, the image processing device 1 may generate a shutter flag signal as information indicating whether or not a frame is a shutter frame. For example, a shutter flag signal indicating that a frame is a shutter frame may be set to be "1", and a shutter flag signal indicating that a frame is not a shutter frame may be set to be "0".

(Background Image Updating Unit)

In a case in which a far-infrared image which is an open image captured by the infrared camera 102 is a background image, the background image updating unit 150 updates a background image stored in the storage unit 160 to the far-infrared image after shutter correction which is input from the shutter correction unit 140. Note that, when a far-infrared image which is an open image is captured by the infrared camera 102, the image processing device 1 may generate information indicating whether or not a frame corresponding to the far-infrared image is a frame corresponding to the background image. Thereby, each functional portion in the image processing device 1 may determine whether or not a far-infrared image input from the shutter correction unit 140 is a background image or a target image.

For example, the background image may be captured in advance by the infrared camera 102, and may be stored in the storage unit 160. Specifically, the background image is captured immediately after the accommodation space L102 is temporarily closed by the shutter 102g. In other words, the background image corresponds to a frame immediately after any one shutter frame.

Note that, in a case in which it is determined that a target region is not present over a predetermined frame, the background image updating unit 150 may determine that a far-infrared image input from the shutter correction unit 140 is a background image. Determination of whether or not a target region is present over a predetermined frame may be realized by using an inter-frame differencing technique to be described later. For example, a configuration may be adopted in which information regarding a target region extracted by the background differencing processing unit 170 is output from the background differencing processing unit 170 to the background image updating unit 150, and in this case, the background image updating unit 150 may determine whether or not a far-infrared image input from the shutter correction unit 140 is a background image on the basis of the information.

In addition, even when it is determined that a target region is not present over a predetermined frame before a time when the shutter 102g is first closed after a predetermined period elapses from a time when the infrared camera 102 is started up, the background image updating unit 150 may not determine that a far-infrared image input from the shutter correction unit 140 is a background image. Here, a sudden increase in the temperature inside the housing 102a may occur before a time when the shutter 102g is first closed after a predetermined period elapses from a time when the infrared camera 102 is started up. Such a sudden increase in the temperature inside the housing 102a may become a disturbance with respect to a pixel value of a far-infrared image to be obtained. Therefore, it is possible to suppress the influence of a disturbance on the background image by prohibiting determination of whether or not it is a background image under the above-described predetermined condition as described above. Note that it is more preferable that the background image updating unit 150 prohibit determinations of whether or not it is a background image until it is determined that the temperature inside the housing 102*a* is stabilized.

Further, in a case in which a far-infrared image which is an open image captured by the infrared camera 102 is a target image, the background image updating unit 150 outputs the far-infrared image after shutter correction which is input from the shutter correction unit 140 to the background differencing processing unit 170.

(Storage Unit)

The storage unit 160 stores data referred to in each processing performed by the image processing device 1. For example, the storage unit 160 stores a closed image which has been recently captured and used in shutter correction processing performed by the shutter correction unit 140. In addition, the storage unit 160 stores information regarding a function F and a background image which is used in a process of extracting a target region using a background differencing technique performed by the background differencing processing unit 170 and has been recently captured.

(Background Differencing Processing Unit)

The background differencing processing unit 170 extracts a target region in which an object in a target image is seen using a background differencing technique. As illustrated in FIG. 6, the background differencing processing unit 170 includes a counter calculation unit 171, a pixel value conversion unit 173, a subtraction unit 175, and a binarization unit 177.

The counter calculation unit 171 calculates a counter value t corresponding to an elapsed time after the accommodation space L102 is temporarily closed by the shutter 102*g*, and outputs a result of the calculation of the counter value t to the pixel value conversion unit 173. The counter value t is used in processing performed by the pixel value conversion unit 173. For example, in a case in which a shutter flag signal generated when a far-infrared image is captured by the infrared camera 102 is "1", the counter calculation unit 171 determines that a frame corresponding to the far-infrared image is a shutter frame, and sets the counter value t to 0. In other words, in a case in which a far-infrared image captured by the infrared camera 102 is a closed image, the counter calculation unit 171 sets the counter value t to 0. In addition, for example, in a case in which a shutter flag signal generated when a far-infrared image is captured by the infrared camera 102 is "0", the counter calculation unit 171 determines that a frame corresponding to the far-infrared image is not a shutter frame, and adds 1 to the counter value t. In other words, in a case in which a far-infrared image captured by the infrared camera 102 is an open image, the counter calculation unit 171 adds 1 to the counter value t.

The pixel value conversion unit 173 is equivalent to an adjustment unit according to the present disclosure which adjusts any one of a background image which is a far-infrared image having a background, not including an object, seen therein and a target image which is a far-infrared image having the object seen therein, on the basis of an observation pixel value. Specifically, the pixel value conversion unit 173 adjusts a background image stored in the storage unit 160 on the basis of the time change model, and outputs the adjusted background image to the subtraction unit 175. For example, in a case in which a far-infrared image captured by the infrared camera 102 is a target image, the pixel value conversion unit 173 executes the adjustment.

In the time change model of the observation pixel value, specifically, a change in a pixel value of a far-infrared image captured by the bolometer 102*f* with time caused by a fluctuation in the temperature of the bolometer 102*f* due to incidence of infrared energy from a portion other than a subject are specified. Here, the changes with time mean characteristics of a fluctuation in the pixel value of the captured far-infrared image which are accompanied by the elapse of time. More specifically, as the above-described time change model, a function F for which a change in a pixel value after shutter correction with time in a far-infrared image obtained by continuously imaging a homoiothermic subject is specified may be applied. Hereinafter, a pixel value after shutter correction in a far-infrared image obtained by continuously imaging a homoiothermic subject is also simply referred to as a pixel value after shutter correction.

In the present embodiment, the pixel value conversion unit 173 adjusts a background image stored in the storage unit 160 on the basis of the function F as a time change model of an observation pixel value. Specifically, the pixel value conversion unit 173 converts a pixel value on the basis of a function F with respect to each pixel of a background image stored in the storage unit 160 to adjust the background image. Hereinafter, the function F will be described in more detail.

Specifically, the pixel value conversion unit 173 adjusts the background image by applying a time after the accommodation space L102 is temporarily closed to the function F. In other words, in the function F, a change in a pixel value after shutter correction with time caused by a fluctuation in the temperature of the bolometer 102*f* due to incidence of infrared energy from a portion other than a subject after the accommodation space L102 is temporarily closed are specified. In a case in which shutter correction is used, a fluctuation in the temperature of the bolometer 102*f* occurs due to the accommodation space L102 being temporarily closed by the shutter 102*g* as described above. Therefore, the function F is set as described above, and thus it is possible to appropriately express characteristics of a fluctuation in a pixel value in a case in which shutter correction is used.

For example, the function F is a function of a counter value t, and is represented by the following Expression (1). Note that the counter value t corresponds to an elapsed time after the accommodation space L102 is temporarily closed by the shutter 102*g* as described above. In the function F, a model value of a pixel value after shutter correction at a time corresponding to each counter value t is specified.

[Math. 1]

$$F(t) = \begin{cases} A1 \times t + C0 & (t \leq T0) \\ A2 \times (t - T0) + A1 \times T0 + C0 & (t > T0) \end{cases} \quad (1)$$

Figure 7:
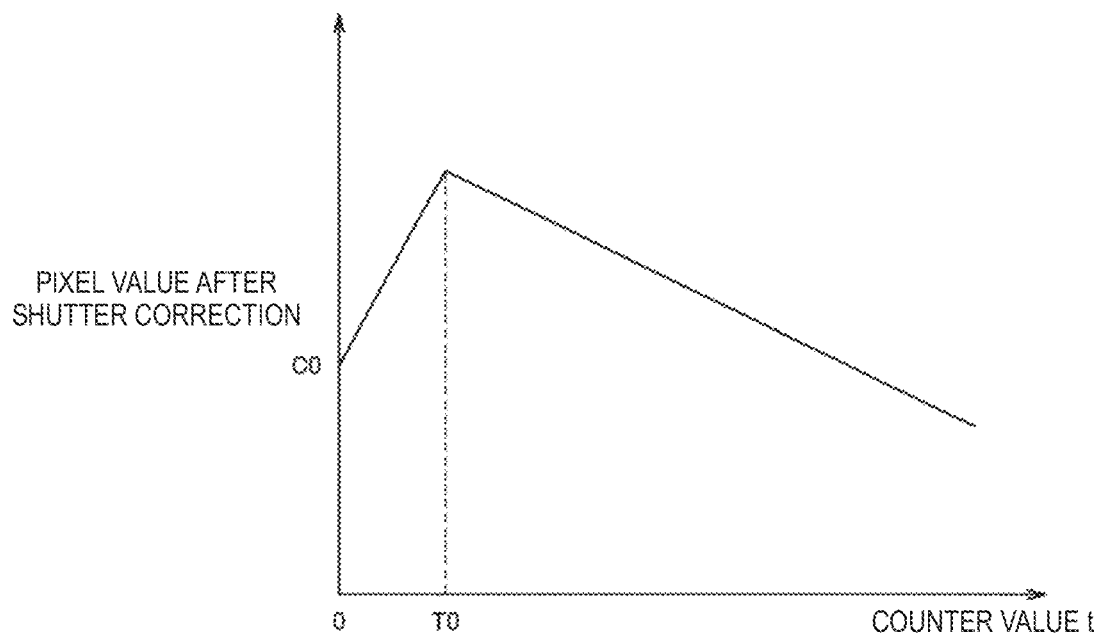
FIG. 7 is a diagram illustrating an example of a function F.

For example, A1, A2, and T0 in Expression (1) are constants which are set in accordance with various design specifications in the image processing device 1. A1 and T0 have positive values, and A2 has a negative value. Note that information regarding the function F such as each constant may be stored in the storage unit 160. FIG. 7 is a diagram illustrating the function F represented by Expression (1). As illustrated in FIG. 7, in the function F, a model value of a pixel value after shutter correction may be set so as to be increased with the elapse of time and then decreased. C0 in Expression (1) is the actual value of a pixel value after shutter correction in a background image captured immediately after the accommodation space L102 is temporarily closed by the shutter 102g. Specifically, the function F represented by Expression (1) specifies a change in a pixel value after shutter correction in a far-infrared image, which is obtained by continuously imaging a background not including an object, with time after the accommodation space L102 is temporarily closed. Note that each constant in the function F may be a fixed value or may be set on the basis of the temperature inside the accommodation space L102, the temperature outside the accommodation space L102, and C0 as will be described later.

Specifically, the pixel value conversion unit 173 converts a pixel value of a background image stored in the storage unit 160 into a value obtained by substituting the function F with a counter value t calculated by the counter calculation unit 171 to adjust the background image. More specifically, the pixel value conversion unit 173 executes the conversion of the pixel value based on the function F with respect to each pixel of the background image.

Here, the background image may be captured immediately after the accommodation space L102 is temporarily closed by the shutter 102g as described above. Therefore, in a case in which a far-infrared image captured by the infrared camera 102 is a target image, a counter value t may correspond to a period of time between a time when the background image is captured and a time when the target image is captured. Accordingly, the pixel value conversion unit 173 can perform adjustment on the basis of the function F to adjust the background image so as to complement a fluctuation in a pixel value caused by a fluctuation in the temperature of the bolometer 102f due to incidence of infrared energy from a portion other than a subject between a time when the background image is captured and a time when the target image is captured. Thereby, a pixel value in a region having a background seen therein in the background image and a pixel value in a region having a background seen therein in the target image can be made to be substantially consistent with each other. Therefore, it is possible to improve the accuracy of a result of comparison between the background image and the target image.

In the function F, a change in a pixel value after shutter correction with time may be specified on the basis of the temperature inside the accommodation space L102 and the temperature outside the accommodation space L102. Thereby, it is possible to more appropriately specify a change in a pixel value with time in a case in which shutter correction is used.

Specifically, in the function F, in a case in which the temperature inside the accommodation space L102 is higher than the temperature outside the accommodation space L102, a change in a pixel value after shutter correction with time may be specified so that a model value of a pixel value after shutter correction is increased with the elapse of time and then decreased. In a case in which the temperature inside the accommodation space L102 is higher than the temperature outside the accommodation space L102, the function F may be set to be, for example, a function represented by Expression (1) illustrated in FIG. 7.

In a state where the infrared camera 102 is driven, the temperature inside the accommodation space L102 is basically higher than the temperature outside the accommodation space L102. In such a case, the accommodation space L102 is temporarily closed by the shutter 102g, and thus heat may be accumulated inside the accommodation space L102 in which the bolometer 102f is accommodated. Thereby, the temperature of the bolometer 102f is increased after the shutter is temporarily closed. In addition, the temperature of the bolometer 102f is decreased after the temperature inside the accommodation space L102 and the temperature outside the accommodation space L102 reach equilibrium. Therefore, a pixel value after shutter correction is increased with the elapse of time and then decreased after the accommodation space L102 is temporarily closed by the shutter 102g. Accordingly, in a case in which the temperature inside the accommodation space L102 is higher than the temperature outside the accommodation space L102, it is possible to more appropriately specify a change in a pixel value after shutter correction with time by setting the function F as described above.

Further, in the function F, a change in a pixel value after shutter correction with time may be specified so that a time change rate of a model value of a pixel value after shutter correction in a case in which the temperature inside the accommodation space L102 is relatively high becomes lower than that in a case in which the temperature inside the accommodation space L102 is relatively low. In a case in which the temperature inside the accommodation space L102 is relatively high, the function F may be set to be, for example, a function F represented by the following Expression (2).

[Math. 2]

$$F(t) = \begin{cases} B1 \times t + C0 & (t \leq T0) \\ B2 \times (t - T0) + B1 \times T0 + C0 & (t > T0) \end{cases} \quad (2)$$

Figure 8:
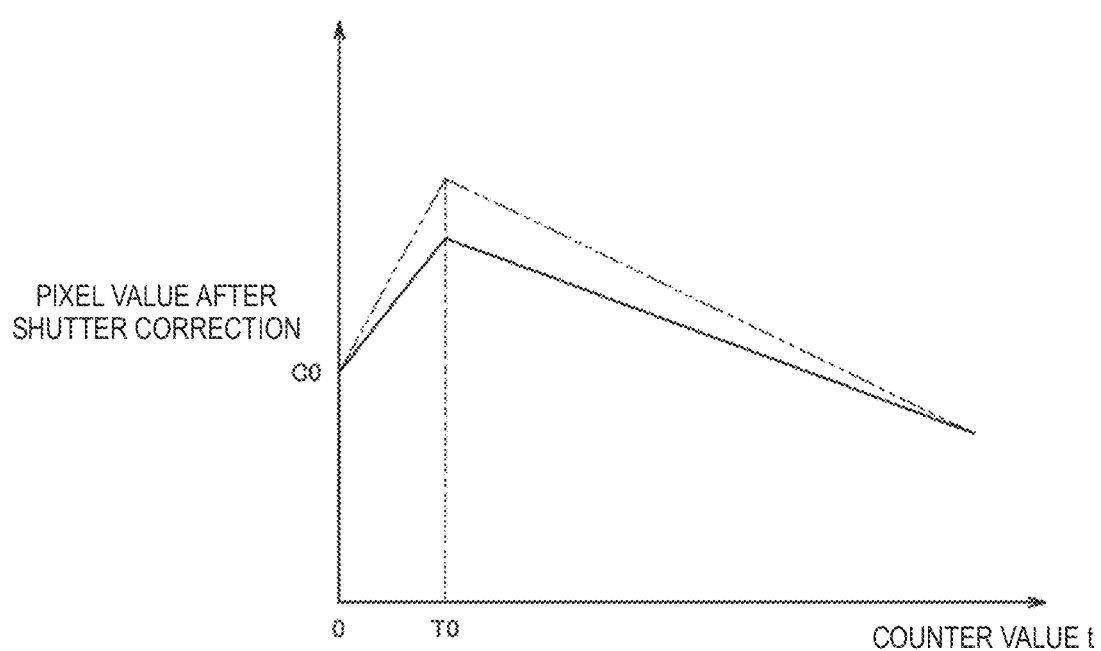
FIG. 8 is a diagram illustrating an example of a function F.

B1 and B2 in Expression (2) are constants. B1 has a positive value, and B2 has a negative value. Absolute values of B1 and B2 are respectively set to values smaller than the absolute values of A1 and A2 in Expression (1). Here, the function F represented by Expression (1) is equivalent to a function which is set in a case in which the temperature inside the accommodation space L102 is relatively low. FIG. 8 is a diagram illustrating a function F represented by Expression (2). In FIG. 8, the function F represented by Expression (1) is indicated by a dashed-two dotted line.

In a case in which the temperature inside the accommodation space L102 is relatively high, the temperature of the bolometer 102f itself is also relatively high, and thus the inflow of heat accumulated inside the accommodation space L102 to the bolometer 102f may be reduced. Thereby, the speed of an increase in the temperature of the bolometer 102f after the accommodation space L102 is temporarily closed by the shutter 102g may become relatively low. Therefore, the speed of an increase in a pixel value after shutter correction after the shutter is temporarily closed may become relatively low. Accordingly, in a case in which the temperature inside the accommodation space L102 is relatively high, it is possible to more appropriately specify a change in a pixel value after shutter correction with time by setting the function F as described above.

Further, in the function F, in a case in which the temperature outside the accommodation space L102 is relatively high, a change in a pixel value after shutter correction with time may be specified so that a time when a model value of the pixel value after shutter correction starts to be decreased becomes earlier than that in a case in which the temperature outside the accommodation space L102 is relatively low. In a case in which the temperature outside the accommodation space L102 is relatively high, the function F may be set to be, for example, a function F represented by the following Expression (3).

[Math. 3]

$$F(t) = \begin{cases} A1 \times t + C0 & (t \leq T1) \\ A2 \times (t - T1) + A1 \times T1 + C0 & (t > T1) \end{cases} \quad (3)$$

Figure 9:
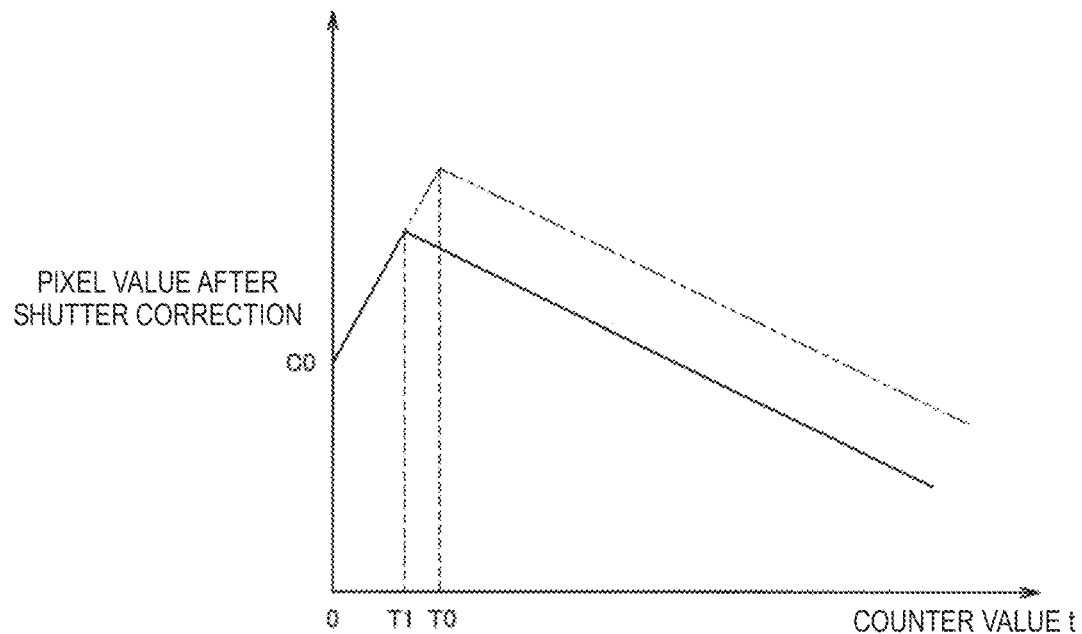
FIG. 9 is a diagram illustrating an example of a function F.

T1 in Expression (3) is a constant. T1 has a positive value. The absolute value of T1 is set to a value smaller than the absolute value of T0 in Expression (1). Here, the function F represented by Expression (1) is equivalent to a function which is set in a case in which the temperature outside the accommodation space L102 is relatively low. FIG. 9 is a diagram illustrating the function F represented by Expression (3). In FIG. 9, the function F represented by Expression (1) is indicated by a dashed-two dotted line.

In a case in which the temperature outside the accommodation space L102 is relatively high, a time when the temperature inside the accommodation space L102 and the temperature outside the accommodation space L102 reach equilibrium after the accommodation space L102 is temporarily closed by the shutter 102g may become relatively earlier. Therefore, a time when a pixel value after shutter correction after the accommodation space L102 is temporarily closed by the shutter 102g starts to be decreased may become relatively earlier. Accordingly, in a case in which the temperature outside the accommodation space L102 is relatively high, it is possible to more appropriately specify a change in a pixel value after shutter correction with time by setting the function F as described above.

Further, in the function F, in a case in which the temperature inside the accommodation space L102 is lower than the temperature outside the accommodation space L102, a change in a pixel value after shutter correction with time may be specified so that a model value of a pixel value after shutter correction is decreased with the elapse of time and then increased. In a case in which the temperature inside the accommodation space L102 is lower than the temperature outside the accommodation space L102, the function F may be set to, for example, a function F represented by the following Expression (4).

[Math. 4]

$$F(t) = \begin{cases} C1 \times t + C0 & (t \leq T2) \\ C2 \times (t - T2) + C1 \times T2 + C0 & (t > T2) \end{cases} \quad (4)$$

Figure 10:
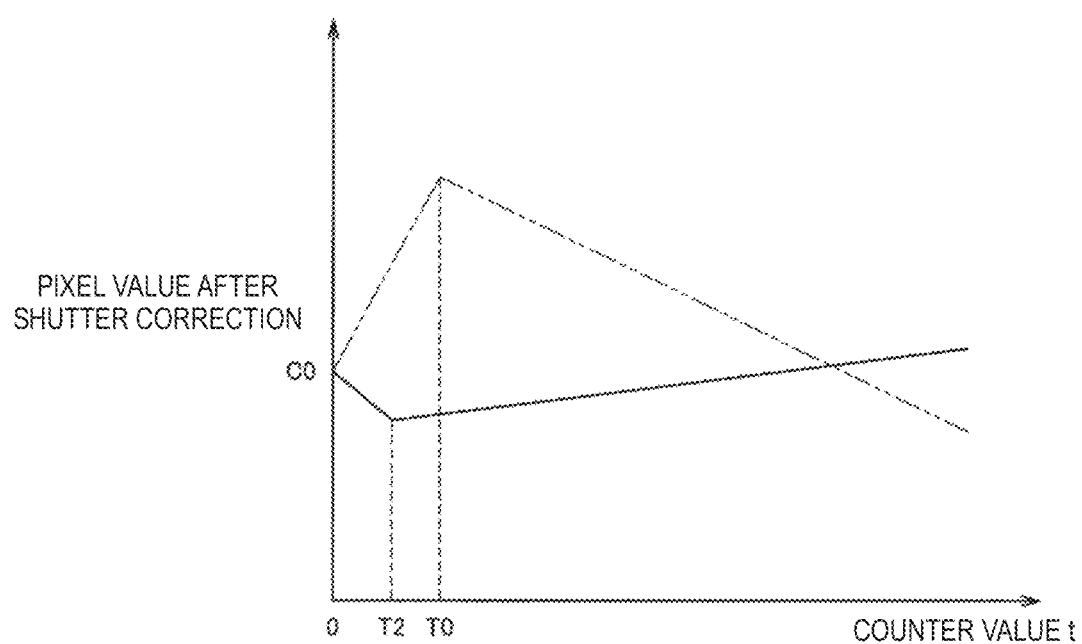
FIG. 10 is a diagram illustrating an example of a function F.

C1, C2, and T2 in Expression (4) are constants. C1 has a negative value, and C2 and T2 have positive values. The absolute value of T2 may be different from the absolute value of T0 in Expression (1). For example, the absolute value of T2 may be set to a value smaller than the absolute value of T0. FIG. 10 is a diagram illustrating a function F represented by Expression (4). In FIG. 10, the function F represented by Expression (1) is indicated by a dashed-two dotted line.

In a case in which the temperature inside the accommodation space L102 is lower than the temperature outside the accommodation space L102, the accommodation space L102 is temporarily closed by the shutter 102g, and thus the inflow of heat into the accommodation space L102 from the outside of the accommodation space L102 may be blocked. Thereby, the temperature of the bolometer 102f is reduced after the accommodation space L102 is temporarily closed by the shutter 102g. In addition, the temperature of the bolometer 102f is increased after the temperature inside the accommodation space L102 and the temperature outside the accommodation space L102 reach equilibrium. Therefore, a pixel value after shutter correction is decreased with the elapse of time and then increased after the accommodation space L102 is temporarily closed by the shutter 102g. Accordingly, in a case in which the temperature inside the accommodation space L102 is lower than the temperature outside the accommodation space L102, it is possible to more appropriately specify a change in a pixel value after shutter correction with time by setting the function F as described above.

Figure 11:
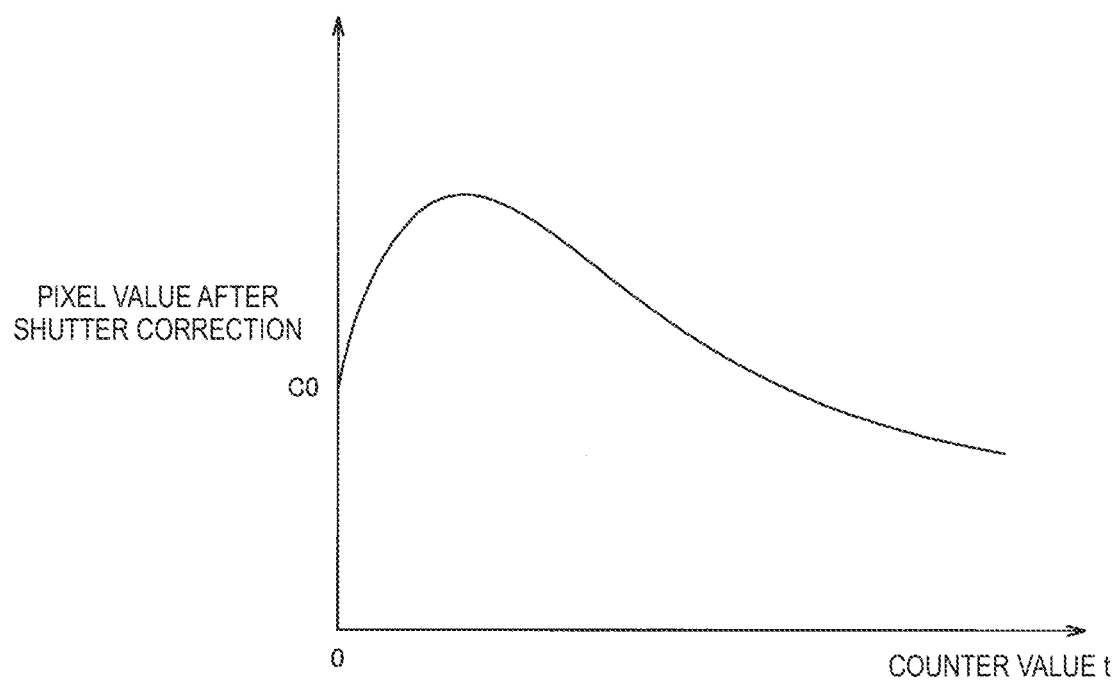
FIG. 11 is a diagram illustrating an example of a function F.

In the above description, an example in which a function F is represented by the composition of linear functions has been described, but the function F is not limited to such an example. For example, the function F may be represented by the composition of exponential functions. Specifically, the function F may be set to, for example, a function F represented by the following Expression (5).

$$F(t) = k(\exp^{(-a1t)} - \exp^{(-a2t)}) + C0 \quad \text{[Math. 5]}$$

k, a1, and a2 in Expression (5) are constants. k, a1, and a2 may have, for example, positive values. Note that the constants in Expression (5) may be fixed values or may be set on the basis of the temperature inside the accommodation space L102, the temperature outside the accommodation space L102, and C0. FIG. 11 is a diagram illustrating a function F represented by Expression (5).

The temperature of the bolometer 102f after the accommodation space L102 is temporarily closed by the shutter 102g is increased and then decreased due to the temperature inside the accommodation space L102 and the temperature outside the accommodation space L102 reaching equilibrium as described above. The speed of an increase in the temperature of the bolometer 102f is reduced with the elapse of time before a time when such thermal equilibrium occurs, and the speed of a decrease in the temperature of the bolometer 102f is increased with the elapse of time after the time when the thermal equilibrium occurs. Accordingly, the speed of an increased in a pixel value after shutter correction is decreased with the elapse of time before a time when thermal equilibrium occurs, and the speed of a decrease in a pixel value after shutter correction is increased with the elapse of time after the time when the thermal equilibrium occurs. Therefore, it is possible to more appropriately specify a change in a pixel value after shutter correction with time by using a function F represented by the composition of exponential functions than in a case in which a function F represented by the composition of linear functions is used.

In the above, a description has been given of an example in which the pixel value conversion unit 173 adjusts a background image using a function F as a time change model of an observation pixel value, but a process of adjusting a background image by the pixel value conversion unit 173 is not limited to such an example. For example, the pixel value conversion unit 173 may adjust a background image using a data table in which a change in a pixel value after shutter correction with time is specified, as a time change model of an observation pixel value. The change in a pixel value after shutter correction with time specified in the data table may be substantially consistent with a change in a pixel value after shutter correction with time specified in the above-described function F. Specifically, in the data table, a pair of a counter value t and a model value of a pixel value after shutter correction which corresponds to the counter value t is associated with each counter value t. The data table may be stored in the storage unit 160. In addition, a plurality of data tables may be stored with respect to each of the values of the temperature inside the accommodation space L102, the temperature outside the accommodation space L102, and C0.

The subtraction unit 175 generates a differential image by obtaining a difference between a pixel value of a background image and a pixel value of a target image after the adjustment is performed by the pixel value conversion unit 173. In addition, the subtraction unit 175 outputs the generated differential image to the binarization unit 177. Specifically, the subtraction unit 175 generates a differential image by performing subtraction of a pixel value between corresponding pixels with respect to the target image and the adjusted background image. Note that the differential image is equivalent to a result of comparison between the background image and the target image.

In the present embodiment, a background image is adjusted by the pixel value conversion unit 173 on the basis of a function F as a time change model of an observation pixel value. Thereby, it is possible to make a pixel value in a region having a background seen therein in the background image and a pixel value in a region having a background seen therein in a target image substantially consistent with each other. Therefore, it is possible to improve the accuracy of a result of comparison between the background image and the target image. Specifically, in a differential image, a pixel value in a region having a background seen therein can be made relatively small.

The binarization unit 177 extracts a target region by performing binarization processing on a differential image input from the subtraction unit 175. In addition, the binarization unit 177 outputs a binarized image as an extraction result. For example, the binarization unit 177 may store the binarized image in the storage unit 160, or may transmit the binarized image to a device outside the image processing device 1. Specifically, the binarization unit 177 allocates a first pixel value which is a relatively small value to a pixel having a pixel value smaller than a threshold value in the differential image, and allocates a second pixel value which is a relatively large value to a pixel having a pixel value greater than the threshold value in the differential image. Thereby, the extraction of a target region having an object seen therein can be realized by allocating the second pixel value to the target region.

In the present embodiment, a background image is adjusted on the basis of a function F as a time change model of an observation pixel value, and thus a pixel value in a region having a background seen therein in a differential image can be made relatively small as described above. Therefore, a first pixel value which is a relatively small value is appropriately allocated to a pixel in a region having a background seen therein in the differential image, and a second pixel value which is a relatively large value is allocated to a pixel in a region having an object seen therein in the differential image. Thereby, it is possible to appropriately extract a target region. Therefore, in the present embodiment, it is possible to extract the target region with a high level of accuracy.

In this manner, the subtraction unit 175 and the binarization unit 177 are equivalent to an extraction unit according to the present disclosure which extracts a target region having an object seen therein in a target image, on the basis of a result of comparison between a background image and the target image after adjustment using a time change model of an observation pixel value is performed by the adjustment unit according to the present disclosure. The extraction unit may extract the target region by comparing pixel values of the background image and the target image with each other after the adjustment is performed. Specifically, the subtraction unit 175 and the binarization unit 177 may extract the target region by obtaining a difference between the pixel values of the background image and the target image with each other after adjustment is performed by the pixel value conversion unit 173 as described above.

In the above, a description has been given of an example in which a target region is extracted by comparing pixel values of a background image and a target image with each other after adjustment is performed by the pixel value conversion unit 173, but a process of extracting a target region after adjustment is performed by the pixel value conversion unit 173 is not limited to such an example. For example, the image processing device 1 may extract a target region by generating a probability density function of the pixel value in the background image and comparing the background image and the target image with each other on the basis of the probability density function after the adjustment is performed by the pixel value conversion unit 173.

Specifically, the image processing device 1 generates a probability density function according to a Gaussian distribution having the pixel value after the adjustment as a median with respect to each of pixels of the background image, after the adjustment is performed by the pixel value conversion unit 173. In addition, the image processing device 1 compares the background image and the target image with each other between the corresponding pixels on the basis of the probability density function. For example, in a case in which a probability that a pixel value of a certain pixel of the target image and a pixel value of a pixel of the background image which corresponds to the pixel are consistent with each other is higher than a predetermined probability, the image processing device 1 may determine that the pixel of the target image constitutes a background region having a background seen therein. In this manner, with respect to pixels of the target image, it is possible to determine whether or not the pixels constitute the background region and to extract a target region by executing binarization processing on the basis of a determination result.

In this manner, the extraction unit according to the present disclosure may generate a probability density function of a pixel value in a background image after adjustment is performed by the adjustment unit according to the present disclosure, and may extract a target region by comparing the background image and a target image with each other on the basis of the probability density function.

[2-3. Operation]

Figure 12:
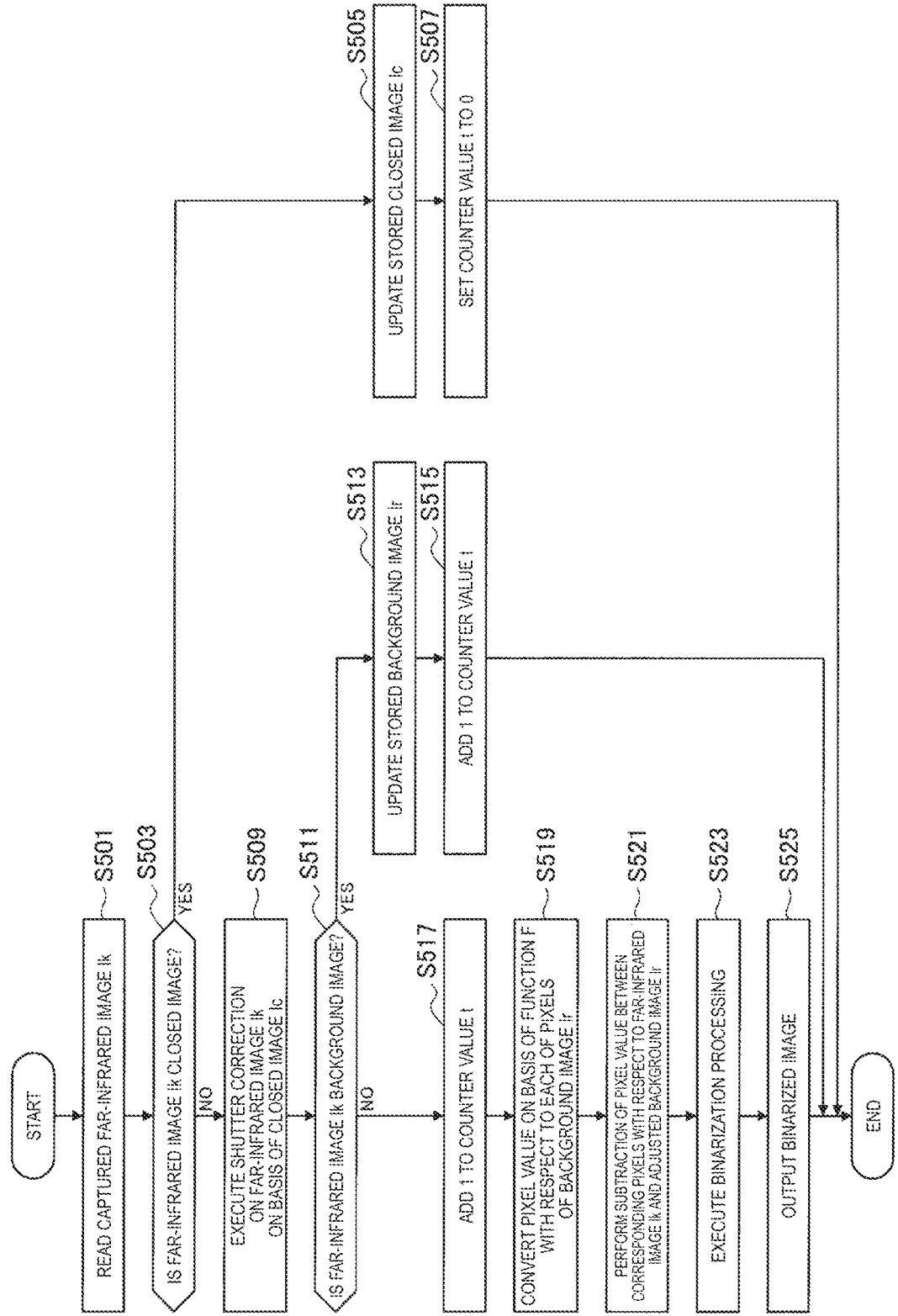
FIG. 12 is a flowchart illustrating an example of a flow of a process performed by the image processing device according to the embodiment.

Next, a flow of a process performed by the image processing device 1 according to the embodiment will be described with reference to FIG. 12. FIG. 12 is a flowchart illustrating an example of the flow of the process performed by the image processing device 1 according to the embodiment. The process illustrated in FIG. 12 can be performed on, for example, each frame.

As illustrated in FIG. 12, first, the shutter correction unit 140 reads a far-infrared image Ik captured by the infrared camera 102 (step S501). Note that the shutter correction unit 140 may directly read the far-infrared image Ik output from the infrared camera 102 or may read the far-infrared image Ik from the storage unit 160 after the far-infrared image Ik is stored in the storage unit 160 from the infrared camera 102. In addition, the shutter correction unit 140 determines whether or not the far-infrared image Ik is a closed image (step S503). In a case in which the far-infrared image Ik is a closed image (step S503/YES), the shutter correction unit 140 updates a closed image Ic stored in the storage unit 160 to the far-infrared image Ik (step S505). In addition, the counter calculation unit 171 sets a counter value t to 0 (step S507), and the processing illustrated in FIG. 12 is terminated.

On the other hand, in a case in which it is determined that the far-infrared image Ik is not a closed image in the determination processing of step S503 (step S503/NO), the shutter correction unit 140 executes shutter correction on the far-infrared image Ik which is an open image on the basis of the closed image Ic (step S509), and outputs the far-infrared image Ik after the shutter correction to the background image updating unit 150. In addition, the background image updating unit 150 determines whether or not the far-infrared image Ik is a background image (step S511). In a case in which it is determined that the far-infrared image Ik is a background image (step S511/YES), the background image updating unit 150 updates a background image Ir stored in the storage unit 160 to the far-infrared image Ik (step S513). In addition, the counter calculation unit 171 adds 1 to the counter value t (step S515), and the processing illustrated in FIG. 12 is terminated.

On the other hand, in a case in which it is determined that the far-infrared image Ik is not a background image in the determination processing of step S511 (step S511/NO), the background image updating unit 150 outputs the far-infrared image Ik which is a target image to the background differencing processing unit 170. In addition, the counter calculation unit 171 adds 1 to the counter value t (step S517). Next, the pixel value conversion unit 173 converts a pixel value on the basis of a function F with respect to each of pixels of the background image Ir (step S519). Thereby, the background image Ir is adjusted, and the pixel value conversion unit 173 outputs the adjusted background image Ir to the subtraction unit 175. In addition, the subtraction unit 175 performs subtraction of a pixel value between the corresponding pixels with respect to the far-infrared image Ik and the adjusted background image Ir (step S521). Thereby, a differential image as a comparison result is generated, and the subtraction unit 175 outputs the generated differential image to the binarization unit 177. Next, the binarization unit 177 executes binarization processing on the differential image (step S523). Thereby, a target region is extracted. In addition, the binarization unit 177 outputs a binarized image as an extraction result (step S525), and the processing illustrated in FIG. 12 is terminated.

3. Modification Example

Subsequently, an image processing device 2 according to a modification example will be described with reference to FIGS. 13 to 15. Unlike the image processing device 1 according to the present embodiment, the image processing device 2 according to the modification example extracts a target region having an object seen therein in a target image using an inter-frame differencing technique.

[3-1. Outline of Inter-Frame Differencing Technique]

First, an outline of an inter-frame differencing technique will be described with reference to FIG. 13, prior to a description of details of the image processing device 2 according to the modification example. FIG. 13 is a diagram illustrating an outline of an inter-frame differencing technique. FIG. 13 illustrates far-infrared images before and after each processing in the inter-frame differencing technique.

Figure 13:
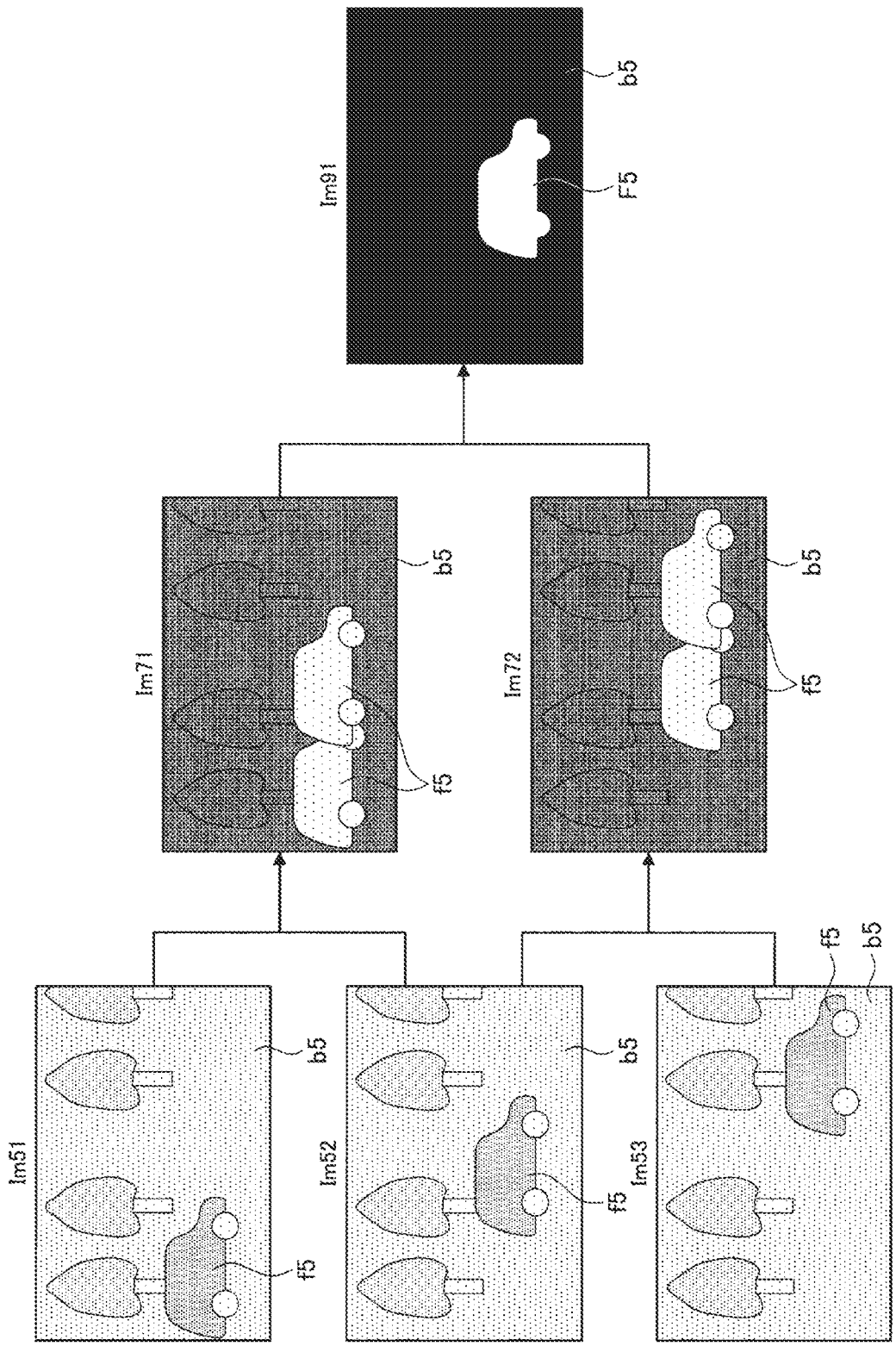
FIG. 13 is a diagram illustrating an outline of an inter-frame differencing technique.
Figure 14:
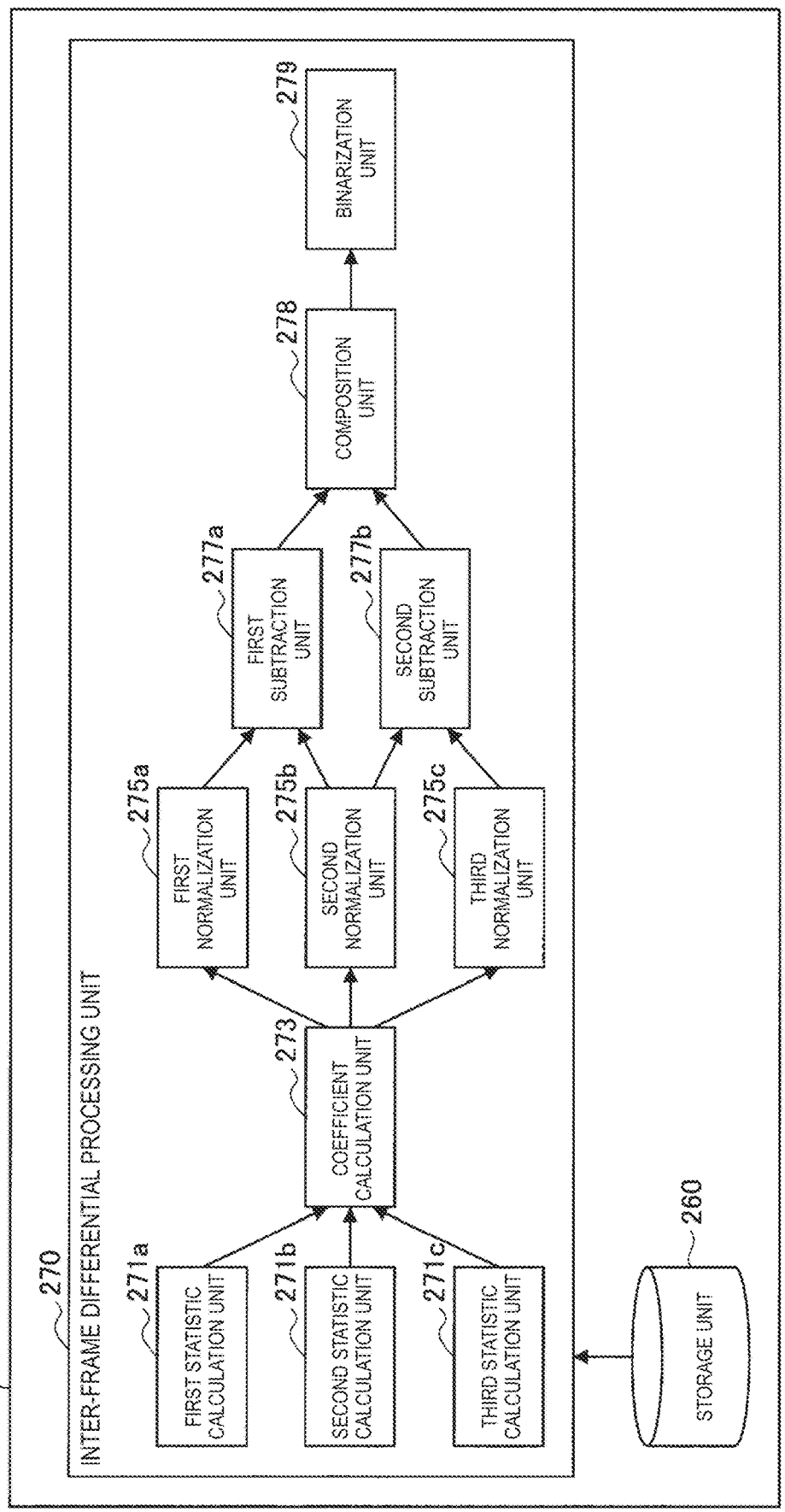
FIG. 14 is a block diagram illustrating an example of a functional configuration of an image processing device according to a modification example.

A far-infrared image Im51, a far-infrared image Im52, and a far-infrared image Im53 illustrated in FIG. 13 are far-infrared images respectively corresponding to consecutive frames. In each of the far-infrared images, a forest road b5 as a background and a vehicle f5 as an object are seen. The vehicle f5 is traveling along a moving direction. Therefore, the vehicle f5 seen in the far-infrared image Im52 is positioned in front (the right side in the drawing), as compared to the far-infrared image Im51. In addition, the vehicle f5 seen in the far-infrared image Im53 is further positioned in front, as compared to the far-infrared image Im52. Here, in the far-infrared images illustrated in FIG. 13, the thickness of hatching indicates sameness and difference between pixel values. A section having thicker hatching is a section having a smaller pixel value. Note that, in the example illustrated in FIG. 13, the far-infrared image Im52 is equivalent to a target image corresponding to a target region extracted in an inter-frame differencing technique. On the other hand, the far-infrared image Im51 and the far-infrared image Im53 are equivalent to a first reference image and a second reference image for extracting a target region.

In the inter-frame differencing technique, specifically, first, a first differential image is generated by obtaining a difference between a target image and a first reference image corresponding to one frame before the target image. In addition, a second differential image is generated by obtaining a difference between a target image and a second reference image corresponding to one frame after the target image. FIG. 13 illustrates a first differential image Im71 generated on the basis of the far-infrared image Im51 and the far-infrared image Im52 and a second differential image Im72 generated on the basis of the far-infrared image Im52 and the far-infrared image Im53.

Subsequently, a composite image is generated by composing the first differential image and the second differential image. Specifically, the composite image is generated by obtaining a logical product of the first differential image and the second differential image. Next, a target region is extracted by performing binarization processing on the composite image. In addition, a binarized image is output as an extraction result. FIG. 13 illustrates a binarized image Im91 generated by performing binarization processing on a differential image between the first differential image Im71 and the second differential image Im72.

In the extraction of a target region according to an inter-frame differencing technique, it may become difficult to extract a target region with a high level of accuracy, similar to the extraction of a target region according to a background differencing technique. Specifically, pixel values in a far-infrared image obtained by continuously imaging a homoiothermic subject may be different from each other with respect to consecutive frames. Therefore, there is a difference in a pixel value in a region having the forest road b5 seen therein with respect to each of the far-infrared image Im51, the far-infrared image Im52, and the far-infrared image Im53. Accordingly, a pixel value in a region having the forest road b5 seen therein may not be a relatively small value in each of the differential image Im71 and the differential image Im72. Thereby, it may become difficult to extract a target region in the binarization processing after the composition processing.

In the extraction of a target region according to an inter-frame differencing technique, a far-infrared image corresponding to each of consecutive frames is used, and thus the accuracy of extraction of a target region is hardly influenced by a fluctuation in the temperature of an imaging element due to incidence of infrared energy from a portion other than a subject, as compared to the extraction of a target region according to a background differencing technique. However, also in the extraction of a target region according to an inter-frame differencing technique, it may become difficult to extract a target region with a high level of accuracy as described above. Hereinafter, a description will be given of the image processing device 2 according to the modification example which is capable of extracting a target region for a far-infrared image with a high level of accuracy in a case in which the above-described inter-frame differencing technique is applied to a captured far-infrared image.

[3-2. Functional Configuration]

Subsequently, a functional configuration of the image processing device 2 according to the modification example will be described with reference to FIG. 14. A hardware configuration of the image processing device 2 according to the modification example may be the same as the hardware configuration of the image processing device 1 described with reference to FIG. 4. FIG. 14 is a block diagram illustrating an example of a functional configuration realized by the components of the image processing device 2 being associated with each other. As illustrated in FIG. 14, the image processing device 2 includes a storage unit 260 and an inter-frame differential processing unit 270.

(Storage Unit)

The storage unit 260 stores data to be referred to in each processing performed by the image processing device 2. For example, the storage unit 260 stores a far-infrared image captured by the infrared camera 102 and used in a target region extraction process using an inter-frame differencing technique performed by the inter-frame differential processing unit 270.

(Inter-Frame Differential Processing Unit)

The inter-frame differential processing unit 270 extracts a target region having an object seen therein in a target image using an inter-frame differencing technique. As illustrated in FIG. 14, the inter-frame differential processing unit 270 includes a first statistic calculation unit 271a, a second statistic calculation unit 271b, a third statistic calculation unit 271c, a coefficient calculation unit 273, a first normalization unit 275a, a second normalization unit 275b, a third normalization unit 275c, a first subtraction unit 277a, a second subtraction unit 277b, a composition unit 278, and a binarization unit 279.

The first statistic calculation unit 271a, the second statistic calculation unit 271b, and the third statistic calculation unit 271c calculate an average luminance value with respect to each of far-infrared images corresponding to consecutive frames, and output a result of the calculation to the coefficient calculation unit 273. Note that the average luminance value is equivalent to an average value of pixel values for all pixels in the far-infrared image.

Specifically, the first statistic calculation unit 271a calculates an average luminance value of a far-infrared image Ik-2 corresponding to a frame before a far-infrared image Ik, which has been recently captured, by two frames. In addition, the second statistic calculation unit 271b calculates an average luminance value of a far-infrared image Ik-1 corresponding to one frame before the far-infrared image Ik which has been recently captured. In addition, the third statistic calculation unit 271c calculates an average luminance value of the far-infrared image Ik which has been recently captured.

Note that the far-infrared image Ik-1 is equivalent to a target image corresponding to a target region extracted in an inter-frame differencing technique. On the other hand, the far-infrared image Ik-2 and the far-infrared image Ik are respectively equivalent to a first reference image and a second reference image for extracting a target region.

The coefficient calculation unit 273 calculates normalization coefficients for making respective average luminance values of the far-infrared image the far-infrared image Ik-1, and the far-infrared image Ik consistent with each other with respect to each of the far-infrared images, and outputs results of the calculation to the first normalization unit 275a, the second normalization unit 275b, and the third normalization unit 275c.

Specifically, the coefficient calculation unit 273 outputs a first normalization coefficient corresponding to the far-infrared image Ik-2 to the first normalization unit 275a. In addition, the coefficient calculation unit 273 outputs a second normalization coefficient corresponding to the far-infrared image Ik-1 to the second normalization unit 275b. In addition, the coefficient calculation unit 273 outputs a third normalization coefficient corresponding to the far-infrared image Ik to the third normalization unit 275c. The normalization coefficients are calculated as values for making average luminance values of the respective far-infrared images, obtained by multiplying pixels of the corresponding far-infrared images by the normalization coefficients, consistent with each other.

The first normalization unit 275a, the second normalization unit 275b, and the third normalization unit 275c adjust the far-infrared images by executing normalization processing for multiplying the far-infrared images by the normalization coefficients corresponding to the far-infrared images, and output the adjusted far-infrared images to the first subtraction unit 277a and the second subtraction unit 277b.

Specifically, the first normalization unit 275a adjusts the far-infrared image Ik-2 by executing normalization processing for multiplying the far-infrared image Ik-2 by the first normalization coefficient, and outputs the adjusted far-infrared image Ik-2 to the first subtraction unit 277a. In addition, the second normalization unit 275b adjusts the far-infrared image Ik-1 by executing normalization processing for multiplying the far-infrared image Ik-1 by the second normalization coefficient, and outputs the adjusted far-infrared image Ik-1 to the first subtraction unit 277a and the second subtraction unit 277b. In addition, the third normalization unit 275c adjusts the far-infrared image Ik by executing normalization processing for multiplying the far-infrared image Ik by the third normalization coefficient, and outputs the adjusted far-infrared image Ik to the second subtraction unit 277b.

In this manner, the coefficient calculation unit 273, the first normalization unit 275a, the second normalization unit 275b, and the third normalization unit 275c adjust a target image and a reference image on the basis of information regarding luminance values of far-infrared images corresponding to a plurality of frames. Specifically, the far-infrared image Ik-1 which is a target image and the far-infrared image Ik-2 and the far-infrared image Ik which are reference images are adjusted so that mutual average luminance values are substantially consistent with each other, on the basis of the average luminance values of the respective far-infrared images. In this manner, in the modification example, adjustment based on information regarding luminance values of far-infrared images corresponding to a plurality of frames is performed, and thus it is possible to adjust a reference image and a target image so as to complement a fluctuation in a pixel value caused by a fluctuation in the temperature of the bolometer 102f due to incidence of infrared energy from a portion other than a subject between a time when the reference image is captured and a time when the target image is captured. Thereby, pixel values in a region having a background seen therein in the respective far-infrared images can be made to be substantially consistent with each other. Therefore, it is possible to improve the accuracy of a result of comparison between the reference image and the target image.

In the above, a description has been given of an example in which the image processing device 2 adjusts far-infrared images so that average luminance values for all pixels are substantially consistent with each other, on the basis of the average luminance values for all pixels of the far-infrared images corresponding to three consecutive frames, but adjustment processing performed by the image processing device 2 is not limited to such an example. For example, the image processing device 2 may model changes in the temperature of pixel values after shutter correction on the basis of average luminance values for far-infrared images corresponding to other plurality of frames different from the far-infrared image Ik-2, the far-infrared image Ik-1, and the far-infrared image Ik, and may adjust pixel values of the far-infrared image Ik-2, the far-infrared image Ik-1, and the far-infrared image Ik on the basis of the modeled changes in the temperature of the pixel values.

In addition, the image processing device 2 may predict the position of a background region having a background seen therein in each of the far-infrared image Ik-2, the far-infrared image Ik-1, and the far-infrared image Ik on the basis of history information of the position of a target region which has already been extracted, and may adjust the far-infrared images so that average luminance values in the predicted background regions are substantially consistent with each other. Note that the target region which has already been extracted is, for example, a target region extracted using an inter-frame differencing technique for a far-infrared image corresponding to a frame before the far-infrared image Ik-1 which is a target image.

Each of the first subtraction unit 277a and the second subtraction unit 277b generates a differential image by obtaining a difference between pixel values of far-infrared images corresponding to adjacent frames after adjustment is performed by the coefficient calculation unit 273 and the normalization units 275a to 275c. In addition, the first subtraction unit 277a and the second subtraction unit 277b output the generated differential image to the composition unit 278. Specifically, each of the first subtraction unit 277a and the second subtraction unit 277b generates a differential image by performing subtraction of a pixel value between corresponding pixels with respect to adjusted far-infrared images corresponding to adjacent frames.

Specifically, the first subtraction unit 277a generates a first differential image by performing subtraction of a pixel value between corresponding pixels with respect to the adjusted far-infrared image Ik-2 and the adjusted far-infrared image Ik-1, and outputs the generated first differential image to the composition unit 278. In addition, the second subtraction unit 277b generates a second differential image by performing subtraction of a pixel value between corresponding pixels with respect to the adjusted far-infrared image Ik-1 and the adjusted far-infrared image Ik, and outputs the generated second differential image to the composition unit 278. Note that the first differential image and the second differential image are equivalent to a result of comparison between a reference image and a target image.

In the modification example, the far-infrared image the far-infrared image Ik-1, and the far-infrared image Ik are adjusted on the basis of information regarding luminance values of far-infrared images corresponding to a plurality of frames. Thereby, pixel values in regions having a background seen therein in the respective far-infrared images can be made to be substantially consistent with each other. Therefore, it is possible to improve the accuracy of a result of comparison between the reference image and the target image. Specifically, in the first differential image and the second differential image, a pixel value in a region having a background seen therein can be made relatively small.

The composition unit 278 generates a composite image by executing composition processing for composing the generated first differential image and second differential image, and outputs the generated composite image to the binarization unit 279. Specifically, the composition unit 278 generates a composite image by obtaining a logical product of the first differential image and the second differential image.

In the modification example, far-infrared images are adjusted on the basis of information regarding luminance values of far-infrared images corresponding to a plurality of frames, so that a pixel value in a region having a background seen therein can be made relatively small in a first differential image and a second differential image as described above. Therefore, in a composite image, a pixel value in a region having a background seen therein is a relatively small value.

The binarization unit 279 extracts a target region by performing binarization processing on a composite image input from the composition unit 278. In addition, the binarization unit 279 outputs a binarized image as an extraction result. For example, the binarization unit 279 may store the binarized image in the storage unit 260, or may transmit the binarized image to a device outside the image processing device 2. Specifically, the binarization unit 279 allocates a first pixel value which is a relatively small value to a pixel having a pixel value smaller than a threshold value in the composite image, and allocates a second pixel value which is a relatively large value to a pixel having a pixel value greater than the threshold value in the composite image. Thereby, the extraction of a target region having an object seen therein can be realized by allocating the second pixel value to the target region.

In the modification example, far-infrared images are adjusted on the basis of information regarding luminance values of far-infrared images corresponding to a plurality of frames, so that a pixel value in a region having a background seen therein can be made relatively small in a composite image as described above. Therefore, a first pixel value which is a relatively small value is appropriately allocated to a pixel in a region having a background seen therein in the composite image, and a second pixel value which is a relatively large value is allocated to a pixel in a region having an object seen therein in the composite image. Thereby, it is possible to appropriately extract a target region. Therefore, in the modification example, it is possible to extract the target region with a high level of accuracy.

In this manner, the first subtraction unit 277a, the second subtraction unit 277b, the composition unit 278, and the binarization unit 279 extract a target region having an object seen therein in a target image, on the basis of a result of comparison between a reference image and a target image after adjustment is performed by the coefficient calculation unit 273 and the normalization units 275a to 275c. Specifically, the first subtraction unit 277a, the second subtraction unit 277b, the composition unit 278, and the binarization unit 279 extract a target region by comparing pixel values of a reference image and a target image with each other after the adjustment is performed. More specifically, the first subtraction unit 277a, the second subtraction unit 277b, the composition unit 278, and the binarization unit 279 extract a target region by obtaining a difference between pixel values of a reference image and a target image equivalent to a pair of far-infrared images corresponding to adjacent frames after the adjustment is performed as described above.

In the above, a description has been given of an example in which a target region is extracted by comparing pixel values of a reference image and a target image with each other after adjustment is performed by the coefficient calculation unit 273 and the normalization units 275a to 275c, but a process of extracting a target region after adjustment is not limited to such an example. For example, the image processing device 2 may extract a target region by generating a probability density function of a pixel value in a reference image after adjustment is performed by the coefficient calculation unit 273 and the normalization units 275a to 275c and comparing a reference image and a target image with each other on the basis of the probability density function.

Specifically, the image processing device 2 generates a probability density function according to a Gaussian distribution having a pixel value after adjustment as a median with respect to each of pixels of the reference image, after the adjustment is performed by the coefficient calculation unit 273 and the normalization units 275a to 275c. In addition, the image processing device 2 compares the reference image and the target image with each other between corresponding pixels on the basis of the probability density function. For example, in a case in which a probability that a pixel value of a certain pixel of the target image and a pixel value of a pixel of the reference image which corresponds to the pixel are consistent with each other is higher than a predetermined probability, the image processing device 2 may determine that the pixel of the target image constitutes a background region having a background seen therein. In this manner, with respect to pixels of the target image, it is determined whether or not the pixels of the target image constitute the background region, and binarization processing is executed on the basis of a determination result, thereby obtaining an image in which boundaries between a region having a background seen therein over adjacent frames and the other regions are formed. It is possible to extract a target region by executing such processing instead of the above-described subtraction processing and then executing composition processing and binarization processing.

[3-3. Operation]

Subsequently, a flow of processing performed by the image processing device 2 according to the modification example will be described with reference to FIG. 15. FIG. 15 is a flowchart illustrating an example of a flow of processing performed by the image processing device 2 according to the modification example. For example, the processing illustrated in FIG. 15 may be executed on each frame.

Figure 15:
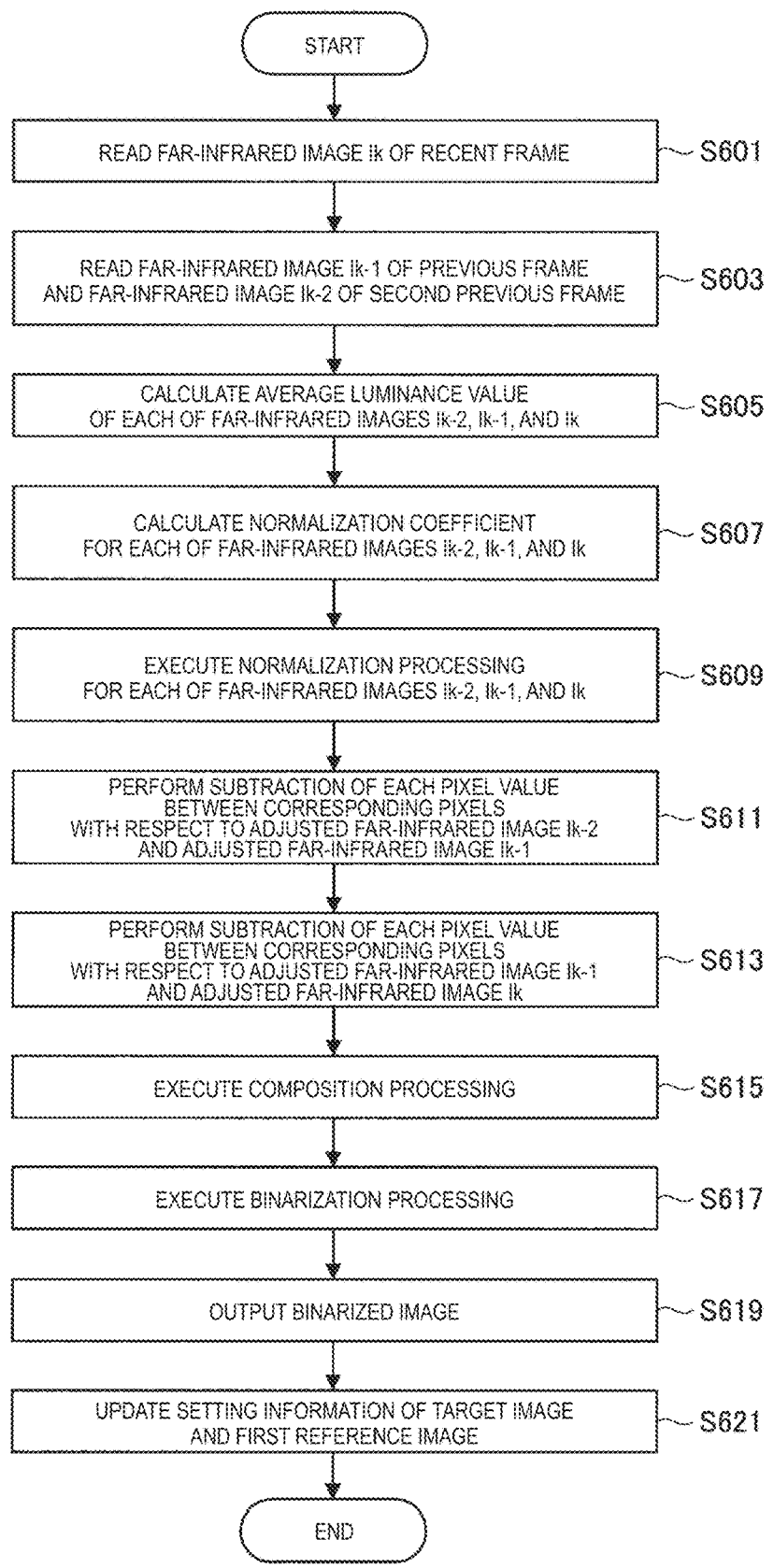
FIG. 15 is a flowchart illustrating an example of a flow of processing performed by the image processing device according to the modification example.

As illustrated in FIG. 15, first, the third statistic calculation unit 271c reads the far-infrared image Ik which has been recently captured by the infrared camera 102 (step S601). Note that the third statistic calculation unit 271c may directly read the far-infrared image Ik output from the infrared camera 102 or may read the far-infrared image Ik from the storage unit 260 after the far-infrared image Ik is stored in the storage unit 260 from the infrared camera 102. Next, the second statistic calculation unit 271b and the first statistic calculation unit 271a respectively read the far-infrared image Ik-1 and the far-infrared image Ik-2 from the storage unit 260 (step S603). Next, the first statistic calculation unit 271a, the second statistic calculation unit 271b, and the third statistic calculation unit 271c respectively calculates average luminance values of the far-infrared image the far-infrared image Ik-1, and the far-infrared image Ik (step S605), and output a result of the calculation to the coefficient calculation unit 273.

In addition, the coefficient calculation unit 273 calculates normalization coefficients for making the average luminance values of the far-infrared image the far-infrared image Ik-1, and the far-infrared image Ik consistent with each other with respect to each of the far-infrared images (step S607), and outputs results of the calculation to the first normalization unit 275a, the second normalization unit 275b, and the third normalization unit 275c. Next, the first normalization unit 275a, the second normalization unit 275b, and the third normalization unit 275c execute normalization processing for multiplying the far-infrared image the far-infrared image Ik-1, and the far-infrared image Ik by the normalization coefficients corresponding to the far-infrared images (step S609). Thereby, the far-infrared images are adjusted, and the first normalization unit 275a, the second normalization unit 275b, and the third normalization unit 275c output the adjusted far-infrared images to the first subtraction unit 277a and the second subtraction unit 277b.

In addition, the first subtraction unit 277a performs subtraction of a pixel value between corresponding pixels with respect to the adjusted far-infrared image Ik-2 and the adjusted far-infrared image Ik-1 (step S611). Thereby, a first differential image is generated, and the first subtraction unit 277a outputs the first differential image to the composition unit 278. Next, the second subtraction unit 277b performs subtraction of a pixel value between corresponding pixels with respect to the adjusted far-infrared image Ik-1 and the adjusted far-infrared image Ik (step S613). Thereby, a second differential image is generated, and the second subtraction unit 277b outputs the second differential image to the composition unit 278. Next, the composition unit 278 executes composition processing for composing the generated first differential image and second differential image (step S615). Thereby, a composite image is generated, and the composition unit 278 outputs the composite image to the binarization unit 279.

In addition, the binarization unit 279 executes binarization processing on the composite image (step S617). Thereby, a target region is extracted. In addition, the binarization unit 279 outputs a binarized image as an extraction result (step S619). Here, setting information of a target image corresponding to one frame before a far-infrared image having been recently captured and a first reference image corresponding a frame before the far-infrared image having been recently captured by two frames, which are used in processing performed by the inter-frame differential processing unit 270, may be registered in the storage unit 260. In this case, the inter-frame differential processing unit 270 updates the setting information by setting the far-infrared image Ik and the far-infrared image Ik-1 as a target image and a first reference image (step S621), and the processing illustrated in FIG. 15 is terminated.

Note that the image processing device 2 according to the modification example may or may not execute shutter correction on captured far-infrared images. In a case in which shutter correction is executed, the image processing device 2 updates the setting information of the target image and the first reference image so that a closed image captured in a state where the shutter 102g is closed is not set as the target image or the first reference image.

Note that a computer program realizing each function of the image processing device 1 according to the above-described embodiment and the image processing device 2 according to the modification example can be produced and mounted on a PC or the like. The image processing device 1 according to the embodiment or the image processing device 2 according to the modification example can be equivalent to a computer. In addition, a computer-readable recording medium storing the computer program can also be provided. Examples of the recording medium include a magnetic disk, an optical disc, a magneto-optical disc, a flash memory, and the like. In addition, the foregoing computer program may be delivered via, for example, a network without using a recording medium. In addition, the functions of the image processing device 1 according to the embodiment and the image processing device 2 according to the modification example may be divided to a plurality of computers. In this case, functions of the plurality of computers can be realized in accordance with the foregoing computer program.

4. Summary

As described above, according to the embodiment of the present disclosure, the pixel value conversion unit 173 adjusts any one of a background image which is a far-infrared image having a background, not including an object, seen therein and a target image which is a far-infrared image having the object seen therein on the basis of a function F as a time change model of an observation pixel value. Thereby, the pixel value conversion unit 173 can adjust any one of the background image and the target image so as to complement a fluctuation in a pixel value caused by a fluctuation in the temperature of the bolometer 102f due to incidence of infrared energy from a portion other than a subject between a time when the background image is captured and a time when the target image is captured. Thereby, a pixel value in a region having a background seen therein in the background image and a pixel value in a region having a background seen therein in the target image can be made to be substantially consistent with each other. Therefore, it is possible to improve the accuracy of a result of comparison between the background image and the target image. In addition, according to the embodiment of the present disclosure, the subtraction unit 175 and the binarization unit 177 extract a target region having an object seen therein in the target image, on the basis of a result of comparison between the background image and the target image after adjustment is performed by the pixel value conversion unit 173. Accordingly, it is possible to extract the target region with a high level of accuracy.

In the image processing device 1 and the image processing device 2 describe above, the adjustment unit extracts a target region on the basis of information (hereinafter, also referred to as related information) related to a change in a pixel value of a far-infrared image, which is captured by an imaging element used to capture a reference image and a target image, with time caused by a fluctuation in the temperature of the imaging element due to incidence of infrared energy from a portion other than a subject, with respect to at least one of the target image or the reference image for extracting the target region. Thereby, it is possible to adjust at least one of the reference image or the target image so as to complement a fluctuation in a pixel value caused by a fluctuation in the temperature of the imaging element due to incidence of infrared energy from a portion other than a subject between a time when the reference image is captured and a time when the target image is captured. Thereby, a pixel value in a region having a background seen therein in the reference image and a pixel value in a region having a background seen therein in the target image can be made to be substantially consistent with each other. Therefore, it is possible to improve the accuracy of a result of comparison between the reference image and the target image. In addition, the extraction unit extracts a target region having an object seen therein in the target image on the basis of the result of comparison between the reference image and the target image after adjustment is performed by the adjustment unit. Accordingly, it is possible to extract the target region with a high level of accuracy.

Note that, in the image processing device 1, a background image is equivalent to the above-described reference image. In addition, the pixel value conversion unit 173 is equivalent to the adjustment unit. In addition, a time change model of an observation pixel value is equivalent to the above-described related information. In addition, the subtraction unit 175 and the binarization unit 177 are equivalent to extraction units. On the other hand, in the image processing device 2, the far-infrared image Ik-2 corresponding to a frame before the far-infrared image Ik having been recently captured by two frames and the far-infrared image Ik having been recently captured are equivalent to reference images. In addition, the coefficient calculation unit 273, the first normalization unit 275a, the second normalization unit 275b, and the third normalization unit 275c are equivalent to adjustment units. In addition, information regarding luminance values of far-infrared images corresponding to a plurality of frames is equivalent to the above-described related information. In addition, the first subtraction unit 277a, the second subtraction unit 277b, the composition unit 278, and the binarization unit 279 are equivalent to extraction units.

Note that, although an example in which a background image may be captured immediately after the accommodation space L102 is temporarily closed by the shutter 102g has been mainly described above, a time when the background image is captured is not limited to such an example. Note that, in a case in which the background image corresponds to a frame after a shutter frame, a function F may be set in accordance with the time when the background image is captured. Specifically, the function F may be set so that a model value of a pixel value which is a value obtained by substituting a counter value t corresponding to the time when the background image is captured for the function F is consistent with the actual value of a pixel value after shutter correction in the background image.

Note that, although an example in which the image processing device 1 adjusts a background image has been described above, the image processing device 1 may adjust a target image. In addition, although an example in which the image processing device 2 adjusts the far-infrared image Ik-2, the far-infrared image Ik-1, and the far-infrared image Ik has been described, the image processing device 2 may adjust at least two of the far-infrared image the far-infrared image Ik-1, and the far-infrared image Ik.

Note that it is possible to extract a target region for a far-infrared image with a high level of accuracy by also applying the adjustment processing based on the time change model of the observation pixel value described with reference to the image processing device 1 to adjustment processing for the far-infrared image the far-infrared image Ik-1, and the far-infrared image Ik in the image processing device 2.

Note that the above-described image processing device 1 or image processing device 2 can be used in various electronic apparatuses. Specifically, the image processing device may be used as a portion of a surveillance camera or an in-vehicle camera. Alternatively, the image processing device may be used in various electronic apparatuses used for smart home. It is also possible to obtain the same effects as those in the above-described image processing device 1 or image processing device 2 using electronic apparatuses according to the present embodiment.

In addition, the series of control processes by each device described in the present specification may be realized using one of software, hardware, and a combination of the software and the hardware. For example, a program including the software is stored in advance on a storage medium (non-transitory media) provided internally or externally in each device. Then, for example, each program is read to the RAM at the time of execution and is executed by a processor such as the CPU. One processor or a plurality of processors may be provided to execute the respective programs.

Moreover, the process described using the flowchart in the present specification may not necessarily be performed in the order shown in the flowchart. Several processing steps may be performed in parallel. Moreover, additional processing steps may be adopted or some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An image processing device including:
an adjustment unit that adjusts any one of a background image which is a far-infrared image showing a background that does not include an object and a target image which is a far-infrared image showing the object, on the basis of a time change model of an observation pixel value; and
an extraction unit that extracts a target region including the object in the target image on the basis of a result of comparison between the background image and the target image after the adjustment is performed.

(2)
The image processing device according to (1),
in which an accommodation space accommodating an imaging element used to capture the background image and the target image is provided to be capable of being temporarily closed, and
the adjustment unit adjusts any one of the background image and the target image by applying a time after the accommodation space is temporarily closed to the time change model.

(3)
The image processing device according to (2), including a correction unit that corrects an open image by correcting a pixel value of the open image which is a far-infrared image captured in a state where the accommodation space is temporarily closed and then opened using a pixel value of a closed image which is a far-infrared image captured in a state where the accommodation space is temporarily closed.

(4)
The image processing device according to (2) or (3), in which, the time change model specifies a time change in a pixel value of a far-infrared image captured by the imaging element caused by a fluctuation in a temperature of the imaging element due to incidence of infrared energy from a portion other than a subject.

(5)
The image processing device according to (4), in which the time change model specifies the time change on the basis of a temperature inside the accommodation space and a temperature outside the accommodation space.

(6)
The image processing device according to (5), in which the time change model specifies the time change such that a model value of the pixel value of the far-infrared image captured by the imaging element is increased with elapse of time and then decreased in a case in which the temperature inside the accommodation space is higher than the temperature outside the accommodation space.

(7)
The image processing device according to (6), in which the time change model specifies the time change such that a time change rate of the model value in a case in which the temperature inside the accommodation space is relatively high becomes lower than in a case in which the temperature inside the accommodation space is relatively low.

(8)
The image processing device according to (6) or (7), in which the time change model specifies the time change such that a time when the model value starts to be decreased in a case in which the temperature outside the accommodation space is relatively high becomes earlier than in a case in which the temperature outside the accommodation space is relatively low.

(9)
The image processing device according to any one of (6) to (8), in which the time change model specifies the time change such that the model value is decreased with elapse of time and then increased in a case in which the temperature inside the accommodation space is lower than the temperature outside the accommodation space.

(10)
The image processing device according to any one of (4) to (9), in which the adjustment unit adjusts any one of the background image and the target image to complement fluctuation in a pixel value caused by the fluctuation in the temperature of the imaging element due to incidence of infrared energy from the portion other than the subject between a time when the background image is captured and a time when the target image is captured.

(11)
The image processing device according to any one of (2) to (10), including an imaging unit that is capable of capturing a far-infrared image and includes the imaging element.

(12)
The image processing device according to (11), in which the imaging unit includes a shutter capable of temporarily closing a space in which the imaging element is accommodated.

(13)

The image processing device according to any one of (2) to (12), in which the imaging element includes a bolometer.

(14)

The image processing device according to any one of (1) to (13), in which the extraction unit extracts the target region by comparing pixel values of the background image and the target image with each other after the adjustment is performed.

(15)

The image processing device according to any of (1) to (13), in which the extraction unit extracts the target region by generating a probability density function of a pixel value in the background image and comparing the background image and the target image with each other on the basis of the probability density function after the adjustment is performed.

(16)

An image processing method including:

adjusting any one of a background image which is a far-infrared image showing a background that does not include an object and a target image which is a far-infrared image showing the object by an image processing device, on the basis of a time change model of an observation pixel value; and extracting a target region including the object in the target image on the basis of a result of comparison between the background image and the target image after the adjustment is performed.

(17)

An image processing device including:

an adjustment unit that adjusts at least one of a target image which is a far-infrared image showing an object and a reference image for extracting a target region including the object in the target image, on the basis of information related to a time change in a pixel value of a far-infrared image captured by an imaging element used to capture the reference image and the target image caused by a fluctuation in a temperature of the imaging element due to incidence of infrared energy from a portion other than a subject; and an extraction unit that extracts the target region on the basis of a result of comparison between the reference image and the target image after the adjustment is performed.

REFERENCE SIGNS LIST 1, 2 image processing device
102 infrared camera
102a housing
102b first lens
102c second lens
102d light transmitting portion
102e cover portion
102f bolometer
102g shutter
102h outer sensor
102s inner sensor
104 input interface
106 memory
108 display
110 communication interface
112 storage
114 processor
116 bus
140 shutter correction unit
150 background image updating unit
160 storage unit
170 background differencing processing unit
171 counter calculation unit
173 pixel value conversion unit
175 subtraction unit
177 binarization unit
260 storage unit
270 inter-frame differential processing unit
271a first statistic calculation unit
271b second statistic calculation unit
271c third statistic calculation unit
273 coefficient calculation unit
275a first normalization unit
275b second normalization unit
275c third normalization unit
277a first subtraction unit
277b second subtraction unit
278 composition unit
279 binarization unit

The invention claimed is:

1. An image processing device, comprising:

an imaging unit that includes an imaging element, a shutter, and an accommodation space that accommodates the imaging element, wherein the imaging element is configured to capture a first far-infrared image and a second far-infrared image, and the shutter is configured to temporarily close the accommodation space;

an adjustment unit configured to adjust one of the first far-infrared image or the second far-infrared image based on:

a time change model that specifies a time change in a first pixel value of the one of the first far-infrared image or the second far-infrared image, and application of an elapsed time after the accommodation space is temporarily closed, to the time change model, wherein the time change model specifies the time change based on a temperature inside the accommodation space and a temperature outside the accommodation space, the time change is based on a fluctuation of a temperature of the imaging element, the fluctuation of the temperature of the imaging element is based on incidence of infrared energy on the imaging element, the incidence of the infrared energy is based on heat accumulated in the accommodation space, the first far-infrared image comprises a background image of a background excluding an object, and the second far-infrared image comprises a target image of the object; and an extraction unit configured to extract a target region including the object in the target image based on the adjustment and a result of comparison between the background image and the target image.

2. The image processing device according to claim 1, wherein the first far-infrared image corresponds to an open image captured in a first state in which the temporarily closed accommodation space is opened, the image processing device further comprises a correction unit configured to correct the open image by correction of a second pixel value of the open image, and the correction of the second pixel value is based on a third pixel value of a closed image which is a third far-infrared image captured in a second state in which the accommodation space is temporarily closed.

3. The image processing device according to claim 1, wherein
the time change model specifies the time change based on the temperature inside the accommodation space that is higher than the temperature outside the accommodation space, such that a model value of the first pixel value is increased with elapse of a first time and then decreased.

4. The image processing device according to claim 3, wherein
the time change model specifies the time change such that a time change rate of the model value, in a first case in which the temperature inside the accommodation space is a first temperature, becomes lower than that in a second case in which the temperature inside the accommodation space is a second temperature, and
the first temperature is higher than the second temperature.

5. The image processing device according to claim 3, wherein
the time change model specifies the time change such that a second time at which the model value starts to decrease becomes earlier than a third time,
the second time corresponds to a first case in which the temperature outside the accommodation space is a first temperature,
the third time corresponds to a second case in which the temperature outside the accommodation space is a second temperature, and
the first temperature is higher than the second temperature.

6. The image processing device according to claim 3, wherein the time change model specifies the time change based on the temperature inside the accommodation space that is lower than the temperature outside the accommodation space, such that the model value is decreased with elapse of a second time and then increased.

7. The image processing device according to claim 1, wherein
the adjustment unit is further configured to adjust the one of the first far-infrared image or the second far-infrared image to complement fluctuation in the first pixel value,
the fluctuation in the first pixel value is based on the fluctuation in the temperature of the imaging element, and
the adjustment corresponds to a first time that is between a second time at which the background image is captured and a third time at which the target image is captured.

8. The image processing device according to claim 1, wherein the imaging element includes a bolometer.

9. The image processing device according to claim 1, wherein the extraction unit is further configured to extract the target region based on the adjustment, and comparison between pixel values of the background image and pixel values of the target image.

10. The image processing device according to claim 1, wherein
the extraction unit is further configured to generate a probability density function of a second pixel value of the background image, and
the comparison between the background image and the target image is based on the generated probability density function.

11. An image processing method, comprising:
capturing, by an imaging element of an imaging unit of an image processing device, a first far-infrared image and a second far-infrared image;
temporarily closing, by a shutter of the imaging unit, an accommodation space of the imaging unit,
wherein the accommodation space accommodates the imaging element;
adjusting, by an adjustment unit of the image processing device, one of the first far-infrared image or the second far-infrared image based on:
a time change model that specifies a time change in a pixel value of the one of the first far-infrared image or the second far-infrared image, and
application of an elapsed time after the accommodation space is temporarily closed, to the time change model, wherein
the time change model specifies the time change based on a temperature inside the accommodation space and a temperature outside the accommodation space,
the time change is based on a fluctuation of a temperature of the imaging element,
the fluctuation of the temperature of the imaging element is based on incidence of infrared energy on the imaging element,
the incidence of the infrared energy is based on heat accumulated in the accommodation space,
the first far-infrared image comprises a background image of a background excluding an object, and
the second far-infrared image comprises a target image of the object; and
extracting, by an extraction unit of the image processing device, a target region including the object in the target image based on the adjustment and a result of comparison between the background image and the target image.

12. An image processing device, comprising:
an imaging unit that includes an imaging element, a shutter, and an accommodation space that accommodates the imaging element, wherein
the imaging element is configured to capture a first far-infrared image and a second far-infrared image, and
the shutter is configured to temporarily close the accommodation space;
an adjustment unit configured to adjust one of the first far-infrared image comprising a target image of an object or the second far-infrared image comprising a reference image, based on:
a time change model that specifies a time change in a pixel value of the one of the first far-infrared image or the second far-infrared image, and
application of an elapsed time after the accommodation space is temporarily closed, to the time change model, wherein
the time change model specifies the time change based on a temperature inside the accommodation space and a temperature outside the accommodation space,
the time change is based on a fluctuation of a temperature of the imaging element,
the fluctuation of the temperature of the imaging element is based on incidence of infrared energy on the imaging element, and
the incidence of the infrared energy is based on heat accumulated in the accommodation space; and an extraction unit configured to extract a target region including the object in the target image based on the adjustment and a result of comparison between the reference image and the target image.

\* \* \* \* \*